(12) United States Patent
Miller et al.

(10) Patent No.: US 9,260,026 B2
(45) Date of Patent: Feb. 16, 2016

(54) VEHICLE TO WIRELESS POWER TRANSFER COUPLING COIL ALIGNMENT SENSOR

(75) Inventors: John M. Miller, Oak Ridge, TN (US); Paul H. Chambon, Knoxville, TN (US); Perry T. Jones, Knoxville, TN (US); Clifford P. White, Seymour, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 532 days.

(21) Appl. No.: 13/544,058

(22) Filed: Jul. 9, 2012

(65) Prior Publication Data

US 2013/0024059 A1    Jan. 24, 2013

Related U.S. Application Data

(60) Provisional application No. 61/510,210, filed on Jul. 21, 2011, provisional application No. 61/510,231, filed on Jul. 21, 2011, provisional application No. 61/532,763, filed on Sep. 9, 2011.

(51) Int. Cl.
  *G05D 1/00* (2006.01)
  *H02J 7/00* (2006.01)
  (Continued)

(52) U.S. Cl.
  CPC ........... *B60L 11/182* (2013.01); *B60L 11/1829* (2013.01); *B60L 11/1831* (2013.01);
  (Continued)

(58) Field of Classification Search
  CPC ... Y02T 90/121; Y02T 90/122; B60L 11/182; B60L 11/1829; H02J 7/025; H04B 5/0037
  USPC ........................ 701/22; 307/9.1, 104; 320/108
  See application file for complete search history.

(56) References Cited

U.S. PATENT DOCUMENTS

| 4,855,656 A | 8/1989 | Saitoh et al. |
| 5,602,556 A * | 2/1997 | Bowers ......................... 343/742 |

(Continued)

FOREIGN PATENT DOCUMENTS

| DE | 10 2011 015 980 A1 | 10/2012 |
| EP | 2 216 870 A2 | 8/2010 |

(Continued)

OTHER PUBLICATIONS

International Search Report and Written Opinion dated Oct. 11, 2012, issued in International Application No. PCT/US2012/045904.

(Continued)

*Primary Examiner* — Tuan C. To
(74) *Attorney, Agent, or Firm* — Scully, Scott, Murphy & Presser, P.C.

(57) ABSTRACT

A non-contacting position sensing apparatus includes at least one vehicle-mounted receiver coil that is configured to detect a net flux null when the vehicle is optimally aligned relative to the primary coil in the charging device. Each of the at least one vehicle-mounted receiver coil includes a clockwise winding loop and a counterclockwise winding loop that are substantially symmetrically configured and serially connected to each other. When the non-contacting position sensing apparatus is located directly above the primary coil of the charging device, the electromotive forces from the clockwise winding loop and the counterclockwise region cancel out to provide a zero electromotive force, i.e., a zero voltage reading across the coil that includes the clockwise winding loop and the counterclockwise winding loop.

12 Claims, 14 Drawing Sheets

(51) Int. Cl.
  *H01F 38/14*  (2006.01)
  *B60L 11/18*  (2006.01)
  *H02J 5/00*  (2006.01)
  *H02J 7/02*  (2006.01)

(52) U.S. Cl.
  CPC ......... *B60L11/1833* (2013.01); *B60L 11/1846* (2013.01); *H01F 38/14* (2013.01); *B60L 2250/16* (2013.01); *H02J 5/005* (2013.01); *H02J 7/025* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 8,008,888 B2* | 8/2011 | Oyobe et al. | 320/108 |
| 8,421,274 B2* | 4/2013 | Sun et al. | 307/104 |
| 2005/0225320 A1* | 10/2005 | Lee | 324/207.17 |
| 2008/0054887 A1* | 3/2008 | Lee | 324/207.17 |
| 2009/0102292 A1* | 4/2009 | Cook et al. | 307/104 |
| 2009/0195106 A1* | 8/2009 | Iki | H02K 3/47 310/208 |
| 2010/0001610 A1* | 1/2010 | Iki | H02K 3/26 310/208 |
| 2011/0004278 A1 | 1/2011 | Aghassian et al. | |
| 2011/0082612 A1 | 4/2011 | Ichikawa | |
| 2011/0101788 A1* | 5/2011 | Sun et al. | 307/104 |
| 2011/0121778 A1* | 5/2011 | Oyobe et al. | 320/108 |
| 2011/0169365 A1* | 7/2011 | Calley | H02K 21/227 310/156.02 |
| 2011/0181302 A1* | 7/2011 | Shao et al. | 324/654 |
| 2012/0038238 A1* | 2/2012 | Ishikawa | H02K 3/28 310/208 |
| 2014/0055089 A1* | 2/2014 | Ichikawa et al. | 320/108 |

FOREIGN PATENT DOCUMENTS

| | | |
|---|---|---|
| JP | 2004236476 A | 8/2004 |
| JP | 2008-288889 A | 11/2008 |
| RU | 2 297 928 C1 | 4/2007 |

OTHER PUBLICATIONS

Extended Supplementary European Search Report dated Sep. 7, 2015 received from European Application No. 12814327.8.

* cited by examiner

VEHICLE TO WIRELESS POWER TRANSFER COUPLING COIL ALIGNMENT SENSOR

CROSS-REFERENCE TO RELATED APPLICATIONS

This application claims the benefit of priority from U.S. provisional application No. 61/510,210, filed on Jul. 21, 2011, from U.S. provisional application No. 61/510,231, filed on Jul. 21, 2011, and from U.S. Provisional application No. 61/532,763, filed on Sep. 9, 2011, the contents of which are incorporated herein by reference.

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy. The United States government has certain rights in this invention.

FIELD OF THE INVENTION

The present invention relates to the field of wireless power transfer, and particularly to an alignment sensor for detecting degree of misalignment between a primary coil and a secondary coil for wireless power transfer, and methods of operating the same.

BACKGROUND OF THE INVENTION

Wireless power transfer can be employed to charge a plug-in electric vehicle (PEV) without physical contact between a charging device and the PEV. Charging stations including a primary coil can be installed to provider wireless power transfer to such PEV's. A vehicle including a second coil can be placed in proximity to a primary coil of a charging device for wireless power transfer. The efficiency of wireless power transfer depends on the coupling constant between the primary coil and the secondary coil, e.g., by the percentage of the magnetic flux from the primary coil that is captured by the secondary coil. In order to reliably provide efficient wireless power transfer, it is necessary to ensure that the vehicle is aligned to the charging device including the primary coil within alignment tolerances every time the vehicle is placed in a charging position.

SUMMARY OF THE INVENTION

A non-contacting position sensing apparatus can be employed for both stationary and in-motion wireless power transfer from a charging station to a vehicle in order to ensure proper alignment between a primary coil in a charging device and a secondary coil in the vehicle. For example, in a garage equipped with a charging station, a vehicle can be parked within alignment tolerances above a transmit pad without the need of external guides or wheel chocks.

The non-contacting position sensing apparatus includes at least one vehicle-mounted receiver coil that is configured to detect a net flux null when the vehicle is optimally aligned relative to the primary coil in the charging device. Each of the at least one vehicle-mounted receiver coil includes a clockwise winding loop and a counterclockwise winding loop that are substantially symmetrically configured and serially connected to each other. When the non-contacting position sensing apparatus is located directly above the primary coil of the charging device, the electromotive forces from the clockwise winding loop and the counterclockwise region cancel out to provide a zero electromotive force, i.e., a zero voltage reading across the coil that includes the clockwise winding loop and the counterclockwise winding loop.

The non-contacting position sensing apparatus can be employed to align a vehicle-mounted receiver coil (a secondary coil) with a ground-based wireless power transmitter coil (a primary coil) that generates a magnetic flux field. The non-contacting position sensing apparatus can include a first conductor loop affixed to the vehicle and including a first clockwise winding loop and a first counterclockwise winding loop that are substantially symmetrically positions relative to a geometrical center of a secondary coil of the vehicle that is configured to couple with a primary coil in a charging device. One of the first clockwise and counterclockwise winding loops can be located at a left side area of the secondary coil, and the other of the first clockwise and counterclockwise winding loops can be located at a right side area of the secondary coil of the vehicle. The voltage through the first conductor loop is zero if the secondary coil is aligned to the primary coil. The non-contacting position sensing apparatus can include a second conductor loop affixed to the vehicle and including a second clockwise winding loop and a second counterclockwise winding loop that are substantially symmetrically positions relative to the geometrical center of the secondary coil of the vehicle. One of the second clockwise and counterclockwise winding loops can be located at a fore side area of the secondary coil, and the other of the second clockwise and counterclockwise winding loops can be located at an aft side area of the secondary coil of the vehicle. The voltage through the second conductor loop is zero if the secondary coil is aligned to the primary coil.

The primary coil can be configured to generate a magnetic field that has a twofold rotational symmetry around a vertical axis that passes through a geometrical center of the primary coil. The primary coil can be configured such that the magnetic field has a twofold mirror symmetry between left and right sides. In this case, the voltage through the first conductor loop is zero if the center of the secondary coil is located within the plane of the twofold mirror symmetry between left and right sides. Further, the primary coil can be configured such that the magnetic field has a twofold mirror symmetry between fore and aft sides. In this case, the voltage through the second conductor loop is zero if the center of the secondary coil is located within the plane of the twofold mirror symmetry between fore and aft sides.

According to an aspect of the present disclosure, a structure includes a position sensing apparatus mounted on a vehicle. The position sensing apparatus includes at least a receiver coil configured to generate a voltage in proportion to a net magnetic flux captured in a first loop and a second loop that are serially connected to each other. One of the first loop and the second loop is wound clockwise and another of the first loop and second loop is wound counterclockwise.

According to another aspect of the present disclosure, a method of aligning a vehicle to a charging device for wireless power transfer is provided. A position sensing apparatus is mounted on a vehicle. The position sensing apparatus includes at least a receiver coil configured to generate a voltage in proportion to a net magnetic flux captured in a first loop and a second loop that are serially connected to each other. One of the first loop and the second loop is wound clockwise and another of the first loop and second loop is wound counterclockwise. The vehicle is positioned in a vicinity of a charging device for wireless power transfer. Positional data representing a position of the vehicle relative to the charging device employing the position sensing apparatus while a primary coil in the charging device generates an alternating current (AC) magnetic field. The vehicle is aligned employing the positional data.

DETAILED DESCRIPTION OF THE INVENTION

As stated above, the present invention relates to an alignment sensor for detecting degree of misalignment between a primary coil and a secondary coil for wireless power transfer, and methods of operating the same, which is now described in detail with accompanying figures. The drawings are not drawn to scale.

As used herein, a "grid converter" herein refers to a device that takes alternating current (AC) supply voltage having a frequency less than 1 kHz and generated alternating current (AC) supply voltage having a frequency greater than 1 kHz.

To address the requirement of interoperability for wireless power transfer (WPT), global standardization of WPT operating frequency, coupling coil dimensions and locations on both parking space and vehicle, and the treatment of misalignment between the vehicle mounted receiver coil and the floor mounted (on or embedded in) transmit coil can be employed. For example, SAE J2954 Wireless Charging Task Force has the charter to develop such standards, safety and emissions, and bidirectional communications.

The requirement of safety is inherently satisfied in WPT because the magnetic transfer eliminates the need for vehicle leakage current detection and minimization to prevent shock hazard. This minimizes the need for galvanic isolation of the WPT charging system components so that the power delivered may be taken directly to the vehicle battery pack. However, safety also involves magnetic and electric field emissions and these are already covered by international standards such as ICNIRP and ARPANSA.

Figure 1A:
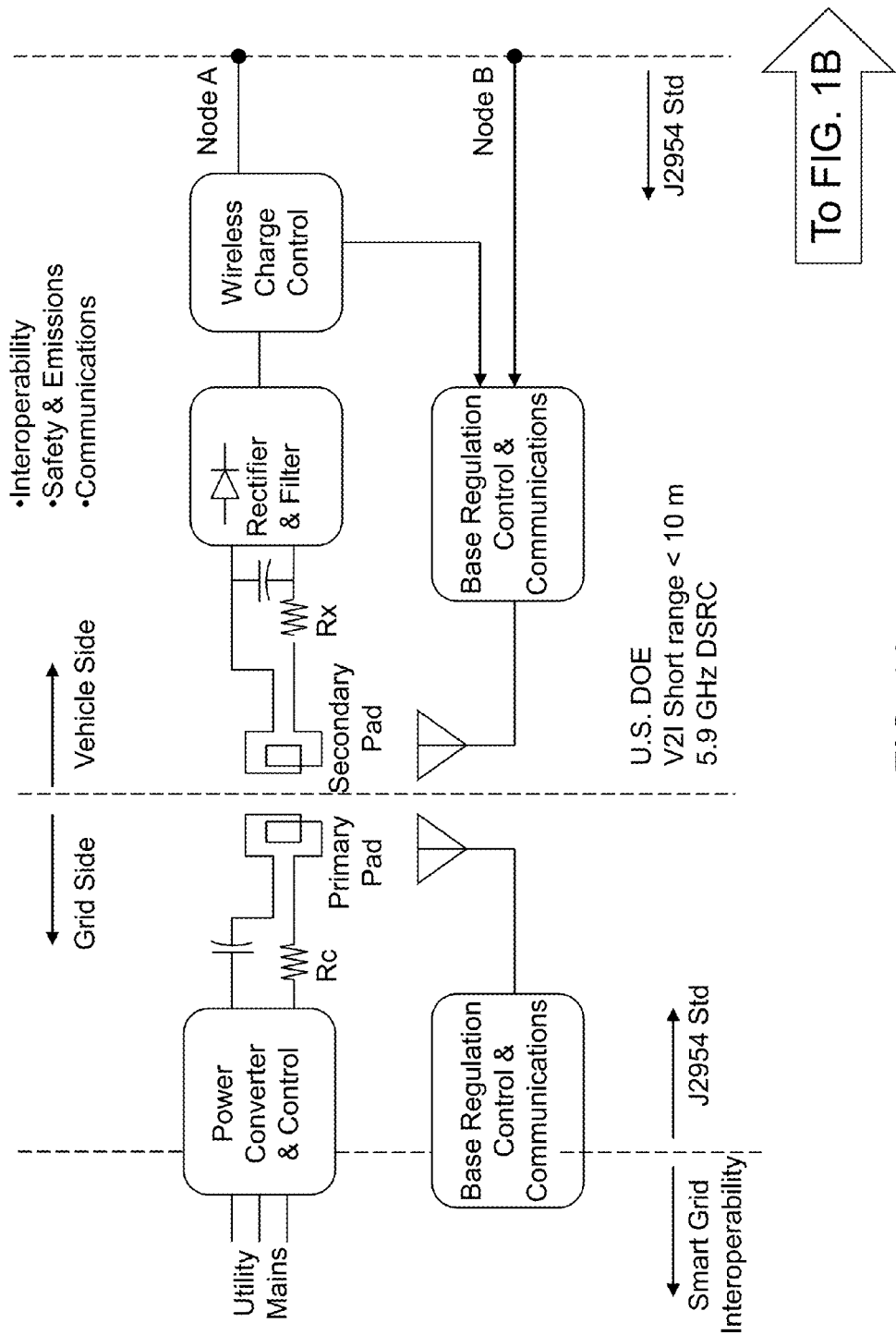
FIGS. 1A and 1B show a functional diagram of an exemplary wireless power transfer system according to an embodiment of the present disclosure.
Figure 1B:
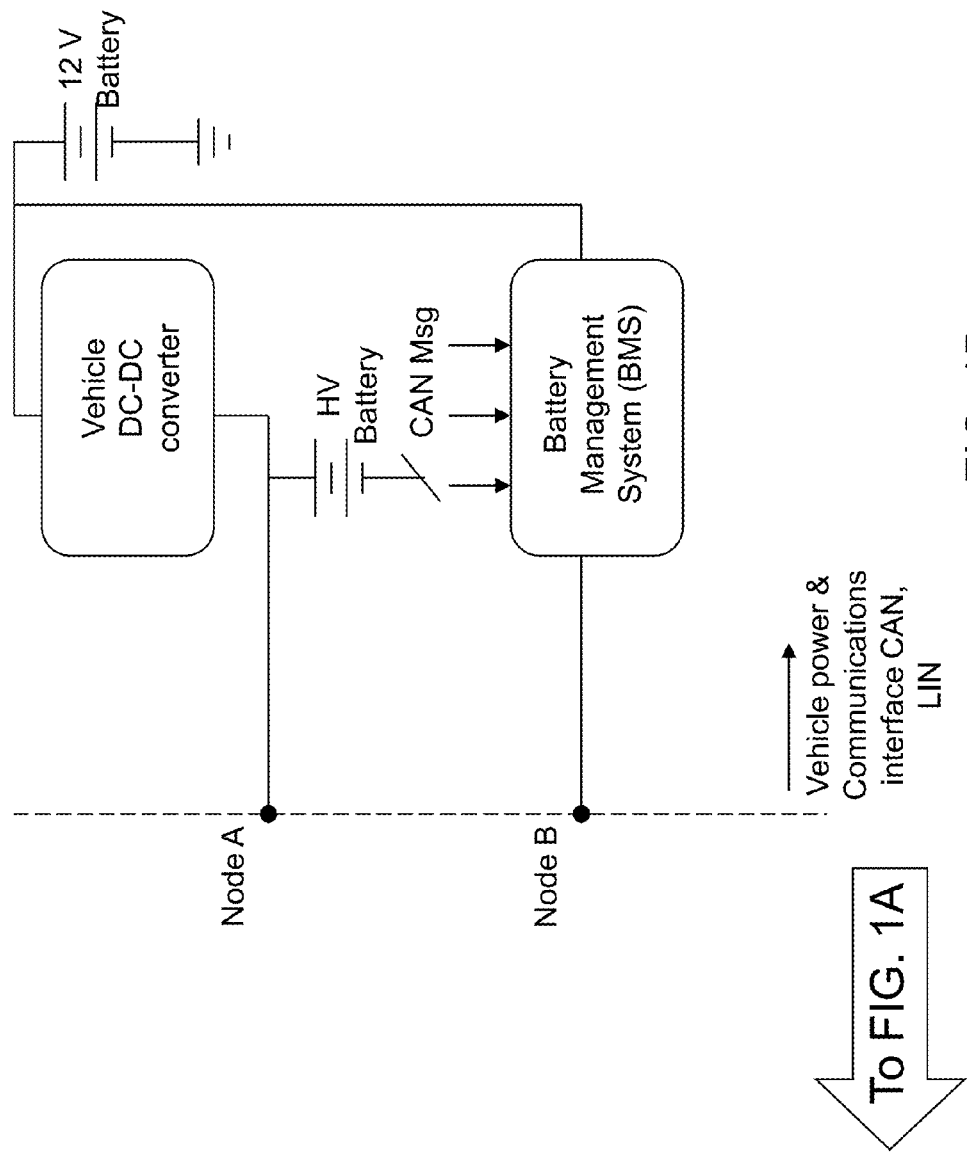

The requirement of bidirectional communications can be satisfied employing vehicle to infrastructure (V2I) communications for the purpose of communicating vehicle location relative to the charging pad, activation signals and regenerative energy storage system (RESS) state-of-charge (SOC), state-of-health (SOH) if needed, charge rate, temperatures, voltage, etc to the grid connected power inverter. The grid converter on the other hand may initiate power transfer by communicating with the vehicle to insure proper location relative to the transmit pad, all clear signals that no obstacles or biologics are present in the active zone and utility rate and time of use (TOU) data for most economic charging. As used herein, an active zone refers to a zone in which the magnetic field induced by the primary coil in the transmit pad (primary pad) is high enough to include substantial induction current if an induction coil of a secondary circuit is placed therein. A transition zone refers to a zone in which the magnitude of the magnetic field is not strong enough to cause significant power transfer through inductive coupling, but is above a level that is deemed to be environmentally safe, e.g., 6.25 µT. A public zone refers to a zone in which the magnitude of the magnetic field is supposed to be within an environmentally safe level, e.g., less than 6.25 µT. Coil to coil location, all clear signal, activate signal, power level and inhibit signals can be employed to provide proper energy management between the WPT charger and the vehicle RESS. The functional diagram in FIGS. 1A and 1B illustrates the overall scheme for energy management and RESS pack regulation needed in WPT.

In the functional diagram of FIG. 1, the grid connected power converter is connected to an appropriate utility service such as a 240 $V_{ac}$, single phase line for level 2 power feed at 3 kW to 7 kW. As used herein, $V_{ac}$ refers to an alternating current voltage, and $V_{dc}$ refers to a direct current voltage. For higher power levels such as direct current (DC) fast charge level 2 (40 kW to 70 kW) or DC fast charge level 3 (>70 kW and up to 250 kW or higher), a 480 $V_{ac}$ and 3-phase connection, or higher voltage such as direct connection to medium voltage distribution line (2.4 kV to 11 kV) can be employed. Once such a power supply is provided, it is feasible to use such high power WPT for commercial applications such as shuttles, trolleys, and transit bus wireless charging. Rectified mains voltage, $U_d$, is processed by a power converter and control module to a controlled duty ratio quasi-square wave at the specified operating frequency as the means to regulate the power delivery.

Resonant magnetic coupling provides a coupling between a primary circuit located on the grid side, i.e., on a charging facility, and a secondary circuit located on a vehicle side, i.e., within a vehicle. Specifically, resonant magnetic coupling provides the non-contacting power transfer medium from a primary coil of the primary circuit located in a primary pad to a vehicle mounted receiver coil, i.e., a secondary coil of the secondary circuit located in a secondary pad that is mounted to the vehicle.

A rectifier and filter module converts the alternating current induced in the secondary coil into a direct current voltage, which applied to a high voltage (HV) battery through a wireless charge control module. A battery management system (BMS) monitors the state of the HV battery, and provides information to a component, within the vehicle, of a base regulation control and communications module. The HV battery can be configured to provide a DC voltage, for example, in a range from 100 V to 1 kV. A vehicle DC-DC converter can be employed to charge a 12 V battery within the vehicle to supply ancillary loads.

Figure 2:
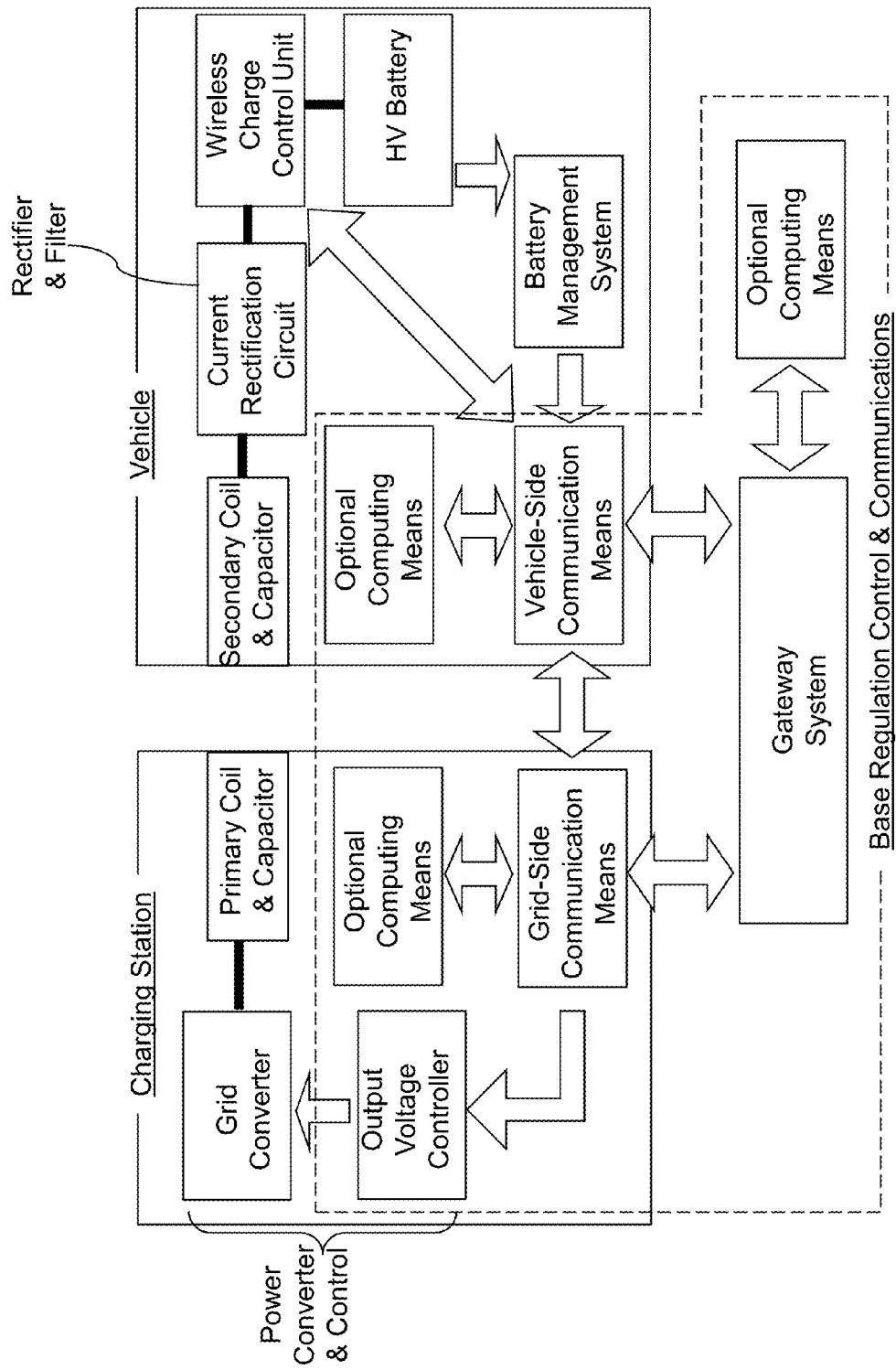
FIG. 2 shows a schematic of a portion of the exemplary wireless power transfer system of FIGS. 1A and 1B according to an embodiment of the present disclosure.

Referring to FIG. 2, a portion of the exemplary wireless power transfer system of FIGS. 1A and 1B is schematically illustrated. The system includes a charging station, a vehicle, and an optional gateway system, and an optional computing means in communication with the gateway system. The charging station includes the primary circuit, which includes the grid converter and the primary coil. The vehicle includes the secondary circuit, which includes the secondary coil, the current rectification circuit, a wireless charge control unit, and a high voltage (HV) battery. The total impedance of the current rectification circuit, the wireless charge control unit, and the HV battery as seen by the combination of the secondary coil and a parallel tuning capacitor of the secondary circuit is herein referred to as the load of the secondary circuit.

The primary circuit includes a grid converter and a primary coil located in a primary pad. The secondary circuit is located in the vehicle and includes a secondary coil, a parallel tuning capacitor, a current rectification circuit connected to the secondary coil, and a battery connected to the current rectification circuit. The vehicle further includes a battery management system configured to measure at least one parameter of the battery, and a vehicle-side communication means configured to transmit information on the at least one parameter of the battery. The at least one parameter is a measure of an effective resistance of the battery as seen by the primary circuit. The charging station can further include an output voltage controller configured to control an alternating current (AC) output voltage of the grid converter based on information derived from the at least one parameter of the battery.

In one embodiment, the AC output voltage can be a quasi-square wave or a square wave, and has a duty ratio in a range from, and including, 0 to, and including, 1. The output voltage controller can be configured to control at least one of a duty cycle of the AC output voltage, a frequency of the AC output voltage, and a magnitude of the AC output voltage. Additionally or alternately, the output voltage controller can be configured to control a duty cycle of the AC output voltage, a frequency of the AC output voltage, and a magnitude of the AC output voltage.

In one embodiment, the at least one parameter of the battery measured by the battery management system can include at least one of temperature of the battery, a voltage level of the battery, and state of charge of the battery. In one embodiment, the at least one parameter of the battery measured by the battery management system can include the temperature of the battery, voltage level of the battery, and state of charge of the battery. Additionally or alternately, the at least one parameter of the battery measured by the battery management system can include the charge rate of the HV battery.

In one embodiment, the at least one parameter of the battery measured by the battery management system can include a parameter that is identical to, or is linearly proportional to, the effective resistance of the battery as seen by the primary circuit.

Optionally, a gateway system can be provided. The gateway system can be configured to receive information on the at least one parameter of the battery as transmitted by the vehicle-side communication means, and can be configured to transmit the information derived from the at least one parameter, directly or indirectly, to the output voltage controller. In one embodiment, the gateway system can employ internet.

In one embodiment, a grid-side communication means can be provided. The grid-side communication means can be configured to receive the information derived from the at least one parameter, and can be configured to relay the information derived from the at least one parameter to the output voltage controller.

In one embodiment, the information derived from the at least one parameter of the battery includes a target value for each of one or more waveform parameters of the AC output voltage of the grid converter. In one embodiment, a computation means configured to generate the one or more target values from the at least one parameter of the battery can be provided within the vehicle, within the charging station, or outside the vehicle and outside the charging station as an independent unit. The computing means is in communication with at least one of a vehicle-side communication means provided within the vehicle, a grid-side communication means provided within the charging station, or with the gateway system. The vehicle-side communication means, the grid-side communication means, the computing means, the output voltage controller for the grid converter, and the optional gateway system collectively constitute a base regulation control and communications system.

In one embodiment, the gateway system can be configured to receive information on the at least one parameter of the battery as transmitted by the vehicle-side communication means, and can be configured to transmit the one or more target values for each of one or more waveform parameters of the AC output voltage of the grid converter, directly or indirectly, to the output voltage controller. The computation means can be in communication with the gateway system.

In one embodiment, the computation means can be located within the vehicle and can be in communication with the battery management system and the vehicle-side communication means. The information on the at least one parameter of the battery as transmitted by the vehicle-side communication means can include the one or more target values for each of one or more waveform parameters of the AC output voltage of the grid converter.

In one embodiment, the computation means can be located within a facility that houses the grid converter, i.e., within the charging station. The computation means can be in communication with the vehicle-side communication means directly or indirectly, and the one or more target values for each of one or more waveform parameters of the AC output voltage of the grid converter can be provided to the grid converter.

In one embodiment, the one or more target values for each of one or more waveform parameters of the AC output voltage of the grid converter can include a target frequency for the AC output voltage. Additionally or alternately, the one or more target values for each of one or more waveform parameters of the AC output voltage of the grid converter can include a target magnitude for the AC output voltage. Additionally or alternately, the one or more target values for each of one or more waveform parameters of the AC output voltage of the grid converter can include a target value for a parameter that controls a magnitude of a fundamental component of the AC output voltage.

In one embodiment, the at least one parameter of the battery that the battery management system measures can include the temperature of the battery and the state of charge (SOC) of the HV battery. As used herein, the state of charge of the battery refers to the ratio of the energy stored in a battery ($Wh_x$) to the total (100% SOC) energy storage capacity of the battery ($Wh_{100}$). The computation means can be configured to determine a charge rate of the battery from the temperature of the battery and the SOC of the battery.

In one embodiment, the at least one parameter of the battery that the battery management system measures can further include a voltage level of the battery. The computation means can be configured to determine the effective resistance of the battery as seen by the primary circuit. Further, the computation means can be configured to determine an input impedance of the secondary circuit as seen by the primary circuit. In addition, the computation means can be configured to determine a frequency at which an imaginary component of input impedance of a circuit including the primary circuit and incorporating the input impedance of the secondary circuit becomes zero.

The primary pad housing the primary coil can be located in any place that a vehicle can be placed proximately to. In one embodiment, the primary coil can be located within a facility configured to park or store vehicles. In another embodiment, the primary coil can be located underneath, or over, a road configured to allow vehicles to pass through. In yet another embodiment, the primary coil can be located within a structure located on a side of a road configured to allow vehicles to pass through.

In a non-limiting exemplary embodiment, the output voltage controller and the grid-side communications means can be embodied in a grid converter V2I communications and regulation control unit. The grid converter V2I communications and regulation control unit can receive, directly or indirectly from the vehicle, dedicated short range communications (DSRC) message for charge level and frequency offset needed for energy management of the regenerative energy storage system (RESS) pack.

The base regulation control and communications function interprets the DSRC message as a command for grid converter duty ration d* and frequency offset f*. The grid converter duty ratio d* provided to the grid converter regulates WPT power level by adjusting the fundamental component, $U_1(t)$, applied to the series resonant primary of the coupling coil assembly. In this expression $T_1=1/f$, and f represents the operating frequency of WPT (when standardized: 10 kHz<f<140 kHz), and pulse time τ is given by $d*T_1/2$.

Figure 3A:
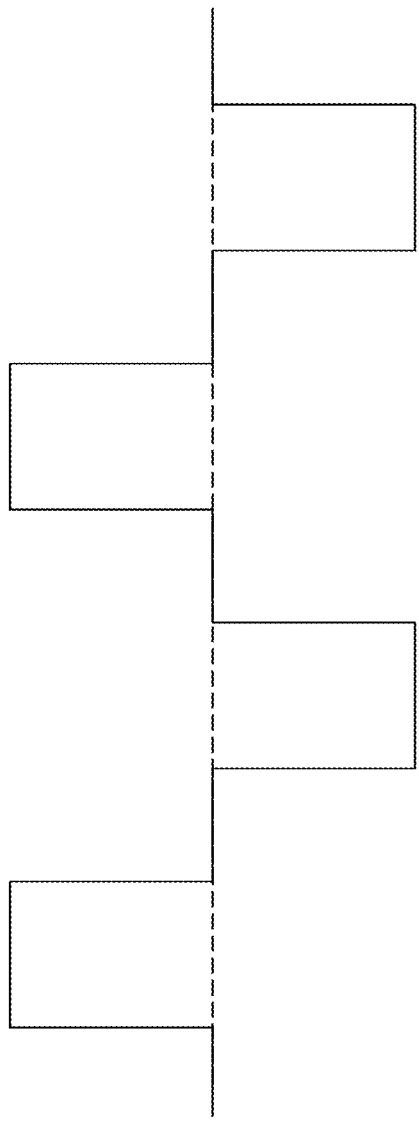
FIG. 3A is a schematic waveform of an alternating current (AC) output voltage of a grid converter according to an embodiment of the present disclosure.
Figure 3B:
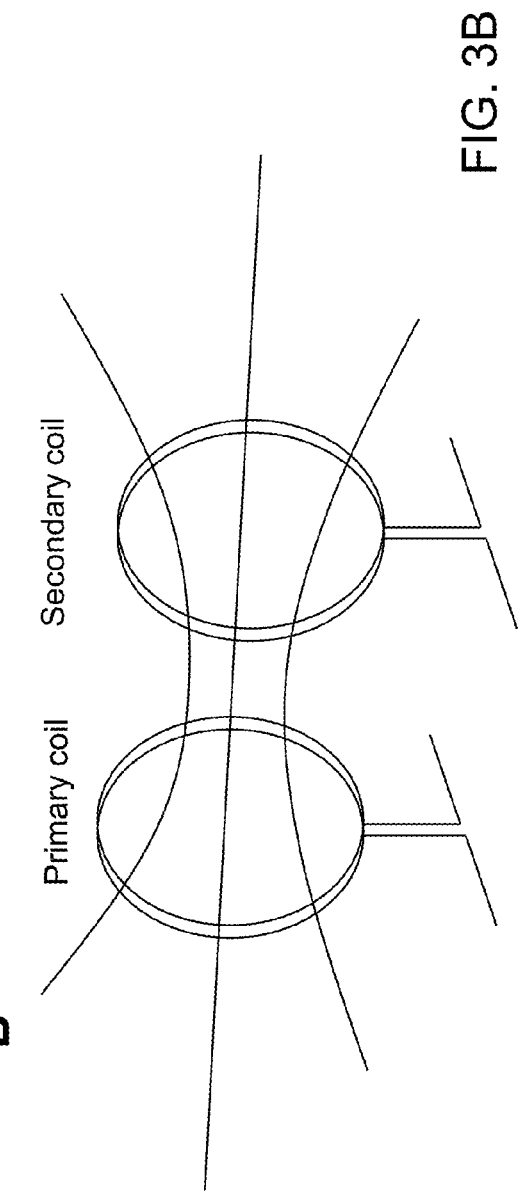
FIG. 3B is a schematic diagram illustrating coupling of a magnetic field between a primary coil and a secondary coil according to an embodiment of the present disclosure.
Figure 3C:
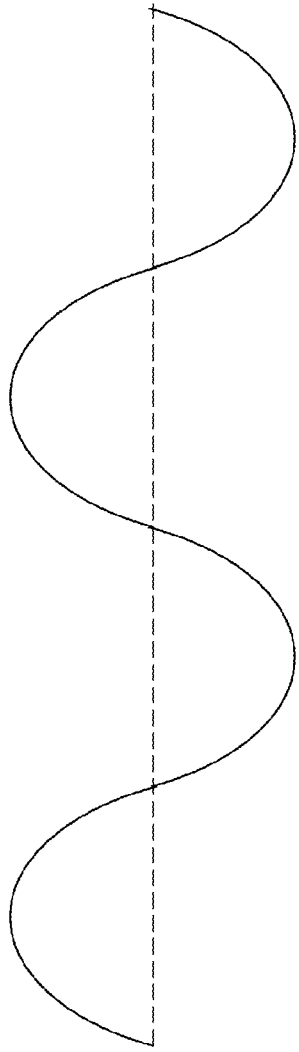
FIG. 3C is a schematic waveform of a secondary current through the secondary coil according to an embodiment of the present disclosure.
Figure 3D:
FIG. 3D is a schematic waveform of a rectified current according to an embodiment of the present disclosure.
Figure 3E:
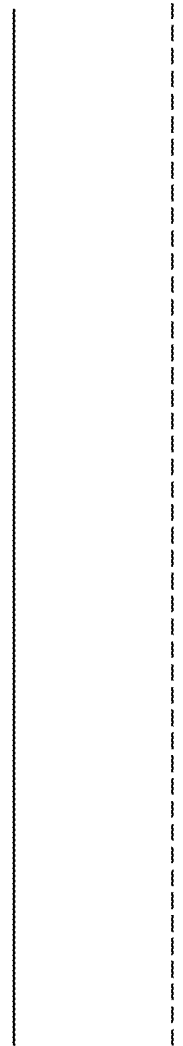
FIG. 3E is a schematic waveform of an ideal direct current (DC) voltage applied across a battery to be charged according to an embodiment of the present disclosure.

Wireless charge coupling coil transmission of the power generated by the grid converter as quasi-square wave voltage to a rectified direct current voltage is illustrated in FIGS. 3A-3E. The quasi-square wave voltage generated by the grid converter can have the waveform illustrated in FIG. 3A. The magnetic coupling between the primary coil and the secondary coil of the magnetic field B as illustrated in FIG. 3B induces a nearly sinusoidal secondary current through the secondary coil of the secondary circuit as illustrated in FIG. 3C. The nearly sinusoidal current is rectified to provide an input voltage as illustrated in FIG. 3D. The receiver WPT coil output, after rectification, is applied to a filter to smooth the high frequency AC ripple prior to injection into the battery pack (assumed to be lithium-ion) of the HV battery. The voltage applied to the HV battery is schematically illustrated in FIG. 3E. The dotted lines in FIGS. 3A, 3C, 3D, and 3E refer to electrical ground, i.e., the voltage of 0 V.

In one embodiment, signals from the battery management system (BMS) and supporting messages from the vehicle CAN network can be routed via the vehicle regulation control and DSRC communications to the grid controller to manage RESS charging. In one embodiment, the EMS signals can include the RESS pack SOC and the temperature, which can be employed to determine the grid converter duty ratio d*. Coupling coil spacing, alignment and RESS charge rate necessitate an additional control signal for frequency offset f*.

Figure 4:
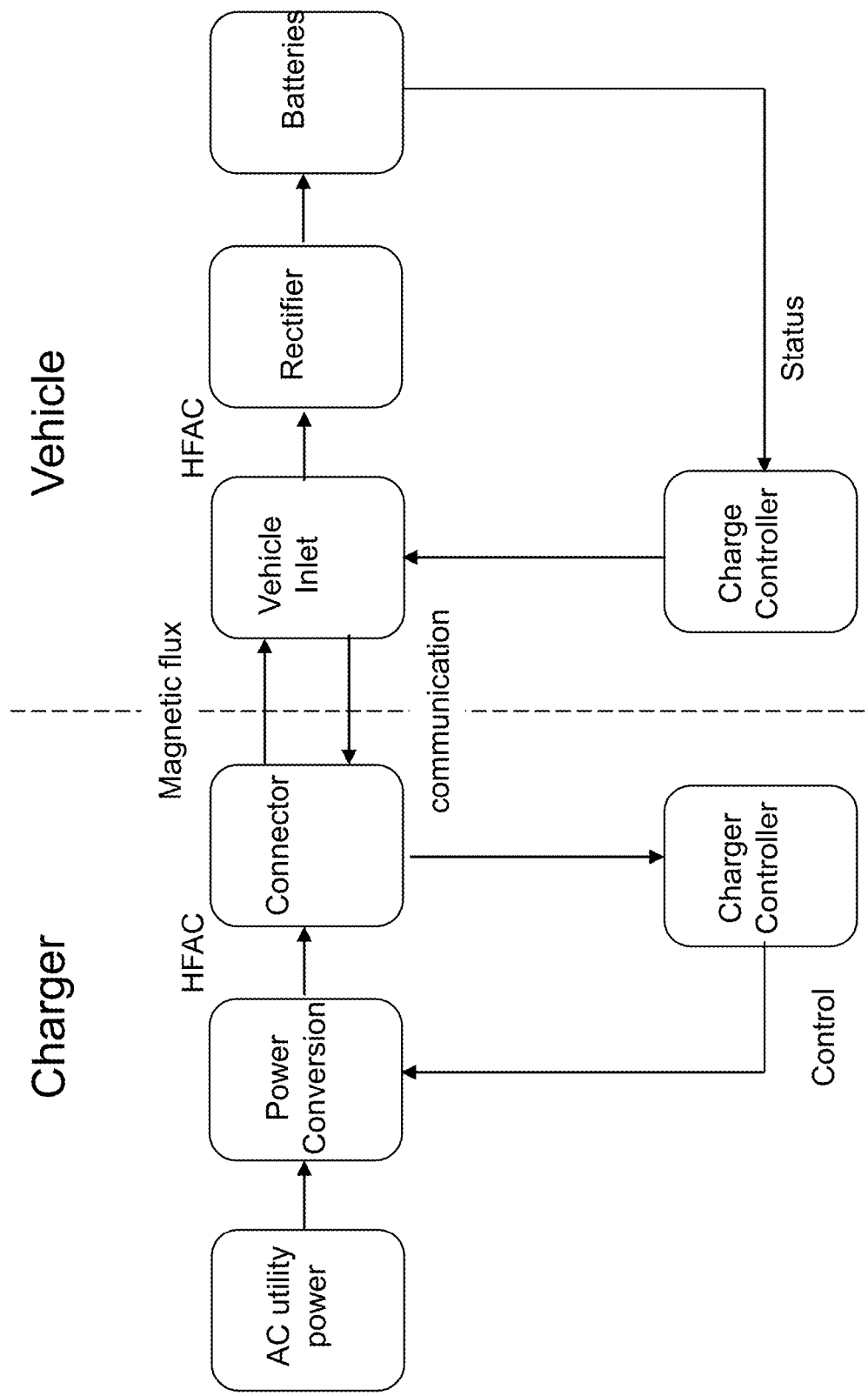
FIG. 4 is a high level functional diagram for the WPT illustrating various modules of an exemplary wireless power transfer system according to an embodiment of the present disclosure.

FIG. 4 is a high level functional diagram for the WPT. The functional diagram of FIG. 4 highlights the major elements of wireless power transmission. The power flow path includes the magnetic flux that passes through the coupling coils, i.e., the primary coil and the secondary coil.

In one embodiment, the communications channel can adhere to U.S. department of transportation (DOT) dedicated short range communications (DSRC), a 5.9 GHz band dedicated to 10 m to 300 m bidirectional, private and secure communications. This channel can be used for all V2I communications. For example, initial hand shaking between the base grid connected power converter and the vehicle can be first performed. The initial hand shaking can take the form of the grid side WPT system assisting in vehicle alignment by interacting through a vehicle parking aid for instance. Subsequently, the system can ensure that no obstacles or biologics are present in the active field zone before enabling the power transfer.

Regarding the power flow regulation, the status signal can be derived from the vehicle on-board battery (RESS), and can become available over the vehicle CAN from the BMS. The status signal can include messages for temperature, SOC, SOH, and a command for inhibiting charging. The feedback signals can include, for example, an enable/inhibit WPT signal, the power rate parameters (such as charge rate $P_{chg}$ and the grid converter duty ratio d*), the frequency offset (f*), and any information associated with charging from multiple pad units such as may be found in a parking structure.

Thus, signals between the grid charger and vehicle can positively identify the vehicle as being parked above transmit pad k of N, where N is the number of individual pads capable of being energized at maximum power from a single grid converter. For the case of on-road dynamic charging this same signal will be used to sequence and energize small groups of embedded transmit coils, for example, 3 at a time out of dozens along a stretch of highway all driven by a single, high power grid converter.

Figure 5:
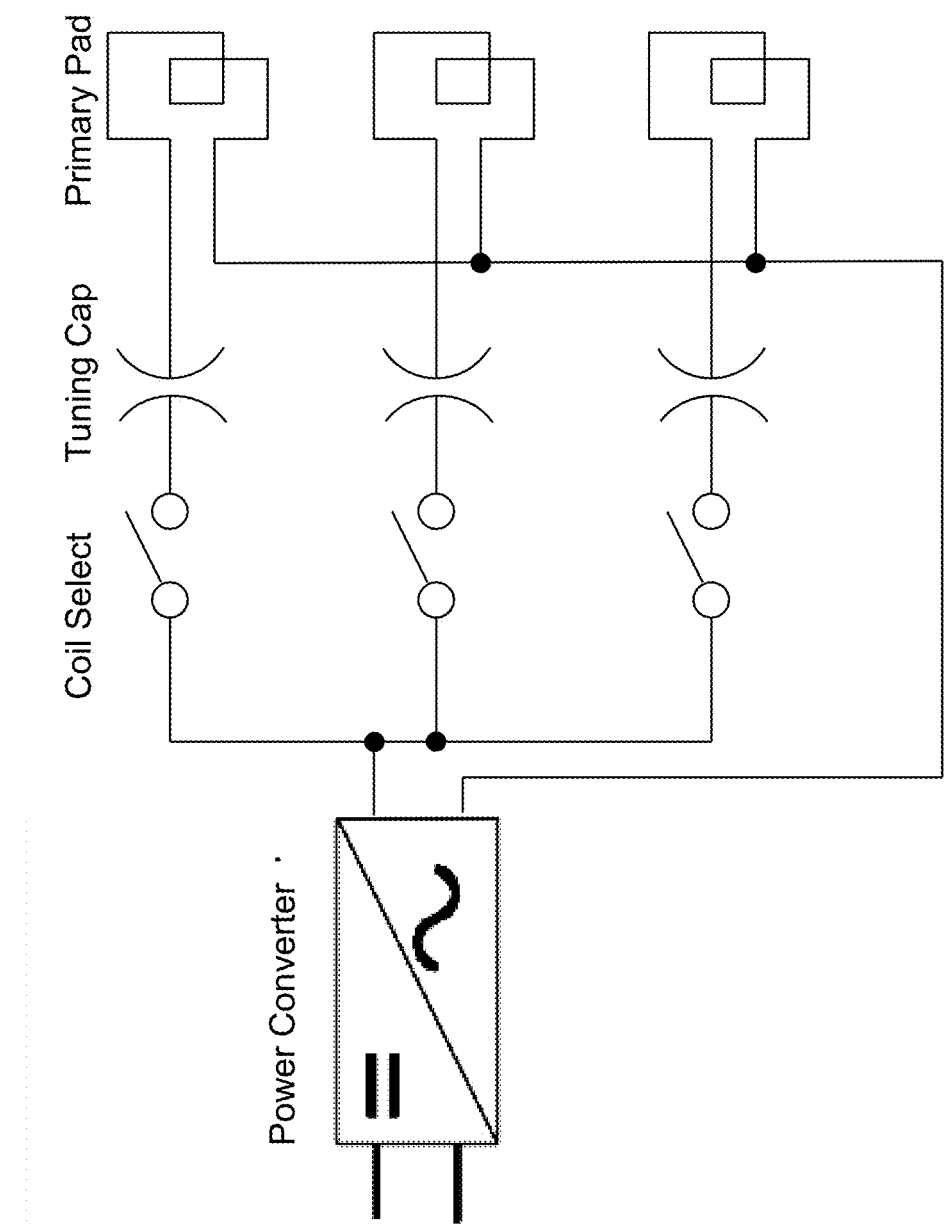
FIG. 5 is a schematic illustrating of the grid side of a wireless power transfer system in a configuration in which a plurality of primary circuits are present according to an embodiment of the present disclosure.

Referring to FIG. 5, a schematic for a charging station is shown, which can be employed for residential, stationary charging and public parking structure parking. A single grid charger is connected to a pair of transmit pads. In general these transmit pads will be individually energized by the power converter via dedicated switchgear and tuning capacitor modules. A vehicle parked above one transmit pad (primary pad) in a parking structure can cause only the pad that the vehicle is parked on energized, while not energizing any other transmit pad in the adjacent parking spaces where occupants can be standing while unloading the vehicle. Each transmit pad is tuned with a separate high voltage and high current ac capacitor.

In an exemplary evanescent wave power transfer demonstrator employed in the course of the research leading to the present disclosure, the tuning capacitors were 600 V high current induction heating units. A higher DC input voltage can also be employed. For example at 300 $V_{dc}$, the coupling coil and capacitor voltages can ring up to 2 kV and higher depending on the frequency and the loading.

Figure 6:
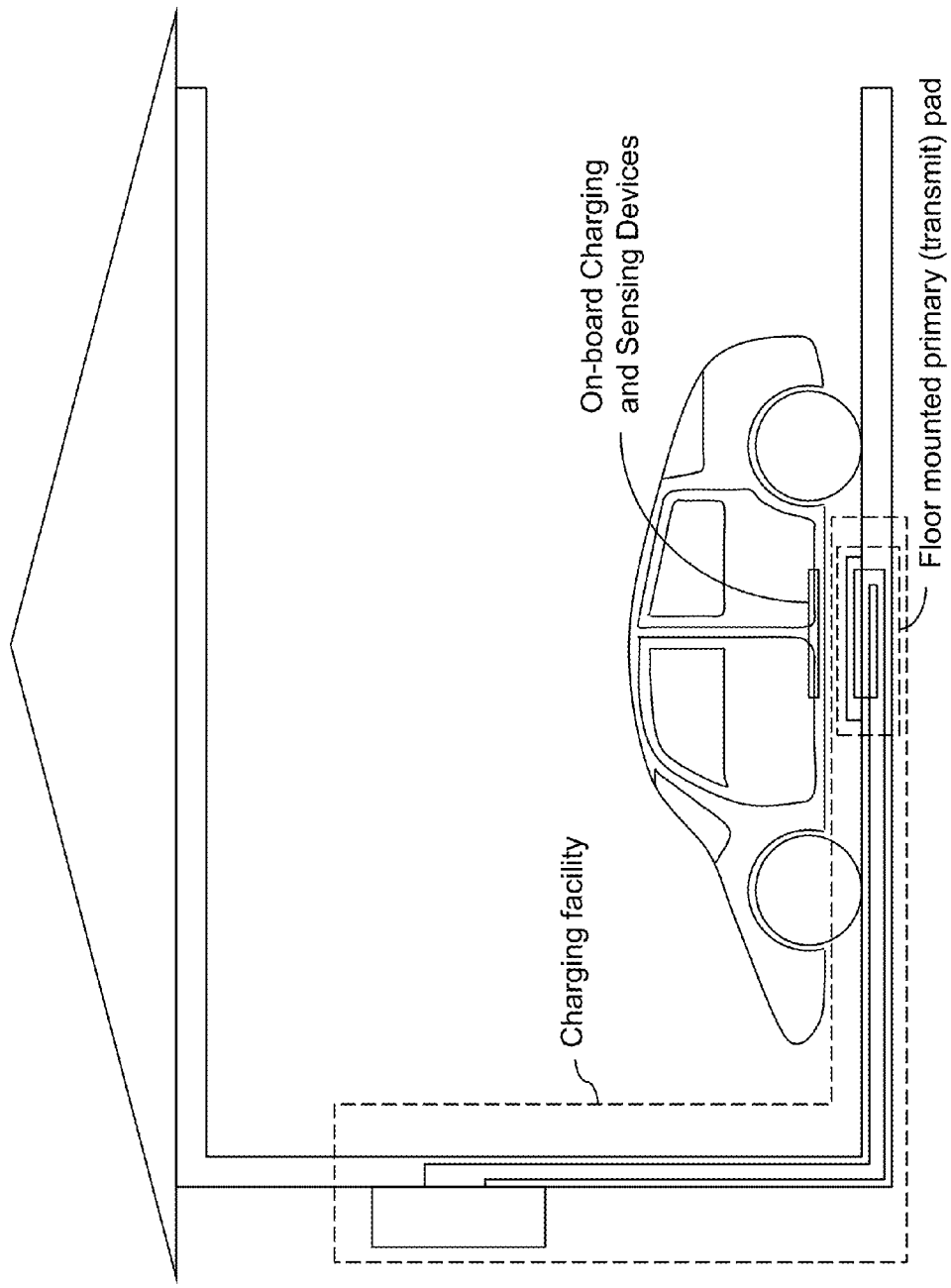
FIG. 6 is a schematic diagram illustrating placement of on-board charging and sensing devices over a floor mounted primary pad in a garage according to an embodiment of the present disclosure.

Referring to FIG. 6, an exemplary charging facility, which is an installation of a charging station in a residential garage, is schematically shown with a vehicle parked therein. The exemplary installation can employ the same circuit as the circuit shown in FIG. 5. A rectangular charging pad installed on a planar bottom surface of the garage is shown. The number of charging pads (i.e., the primary pads of FIG. 5) can be adjusted depending on the size of the garage and the number of vehicles in the household. The vehicle is equipped with an on-board charging and sensing devices in order to enable wireless power transfer from the transmit pad to the on-board vehicle traction battery (not explicitly shown).

Figure 7:
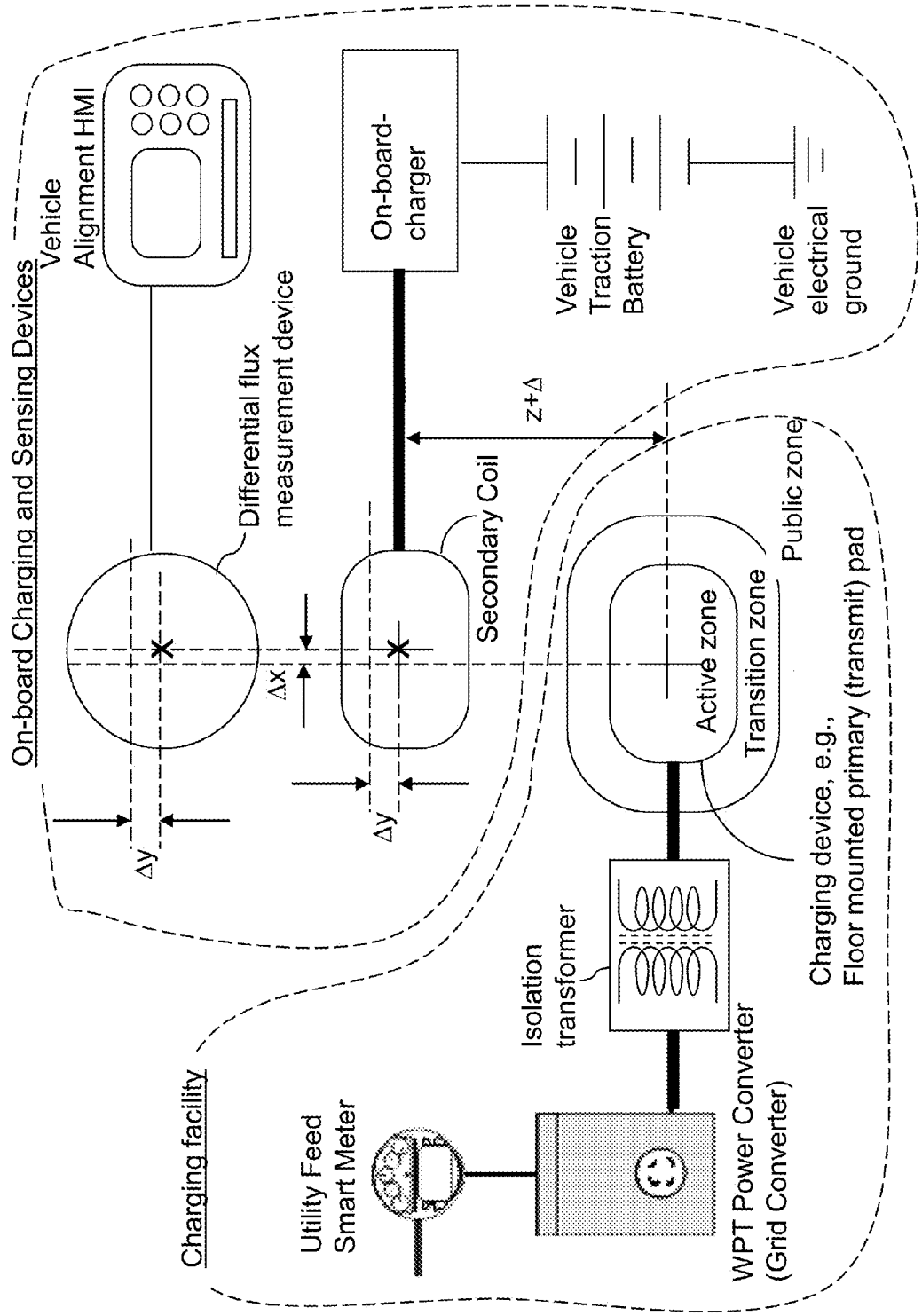
FIG. 7 is a diagram illustrating on-board charging and sensing devices and a charging facility according to an embodiment of the present disclosure.

Referring to FIG. 7, a diagram illustrates placement of on-board charging and sensing devices relative to a charging facility according to an embodiment of the present disclosure. The on-board sensing devices can be employed to help the operator of the vehicle to position the vehicle with alignment tolerances relative to the primary pad, which can be, for example, a floor mounted primary pad. The on-board charging devices can be employed to charge the vehicle traction battery.

The input nodes of a wireless power transfer (WPT) power converter are connected to a utility metering unit. The utility metering unit can be, for example, a utility feed smart meter configured to measure the input power to the WPT power converter and to transmit the information on the power usage to other devices by wireless communication. The WPT power converter can be a grid converter. The output nodes of the WPT power converter are connected to charging device, which can be a WPT transmit pad. The utility metering unit, the WPT power converter, and the charging device collectively constitute the charging facility, which is a wireless power transfer electric vehicle support equipment (WPT EVSE).

The combination of the on-board sensing devices and the on-board charging devices can enable machine-assisted, automated, and/or autonomous parking that places the secondary coil on the vehicle in alignment with the charging device (e.g., a wireless charging pad located on the floor of a garage) at the time of parking or other charging configurations while in motion. The present disclosure provides autonomous means for directing the vehicle into alignment with the charging device by utilizing the spatial variations in the magnetic field generated by the charging facility, and the availability of vehicle to infrastructure (V2I) communications to turn on the magnetic field when the vehicle approaches the charging device. The ability to align the vehicle to the transmit pad can be provided in an economical manner by making optimum use of the installed components and by adding on-board sensing devices configured to utilize V2I communications.

In one embodiment, the on-board sensing devices can include a differential flux measurement device that includes at least one receiver coil, which is different from the secondary coil. Each of the at least one receiver coil can include a first loop located on one side of the secondary coil and a second loop located on the opposite side of the secondary coil. For example, the first coil can be located on the left side of the secondary coil and the second coil can be located on the right side of the coil. Alternately, the first coil can be located on the front side of the secondary coil and the second loop can be located on the aft side of the secondary coil. A first magnetic flux captured by the first coil can be compared with a second magnetic flux captured by the second coil by configuring each of the at least one receiver coil to generate a voltage that is proportional to the difference between the first magnetic flux and the second magnetic flux.

The configuration of a receiver coil that causes the end nodes of the receiver coil to generate a voltage proportional to the difference between the first magnetic flux and the second magnetic flux is herein referred to as a differential-flux configuration. The differential flux configuration can be provided by forming the first loop and the second loop with a same direction of windings, i.e., either clockwise windings or counterclockwise windings, that spiral within a horizontal plane, and by twisting the second loop relative to the first loop such that one of the first loop and the second loop has a clockwise winding and the other of the first loop and the second loop has a counterclockwise winding.

In one embodiment, the on-board sensing device can be integrated with a secondary coil such that the differential flux measurement device overlies or underlies the secondary coil of the on-board charging device. The differential flux measurement device can have a voltmeter that can measure the voltage that is proportional to the difference between the first magnetic flux and the second magnetic flux. The differential flux measurement device can be configured to provide data for a visual display on a vehicle alignment HMI, which can be mounted inside the vehicle and configured to represent the data to the driver of the vehicle in a human-perceptible form. In one embodiment, the visual display can be a polar display that shows the vehicle position relative to the transmitter coil.

The position sensing apparatus can further include a vehicle alignment human-machine interface (HMI) configured to indicate a positional offset of the vehicle relative to the source of the magnetic field as calculated from a measurement on the voltage.

The secondary coil is mounted to the vehicle, and is connected to an on-board charger configured to charge a battery through wireless power transfer employing magnetic coupling of the secondary coil to a primary coil in the charging device located outside the vehicle.

Figure 8:
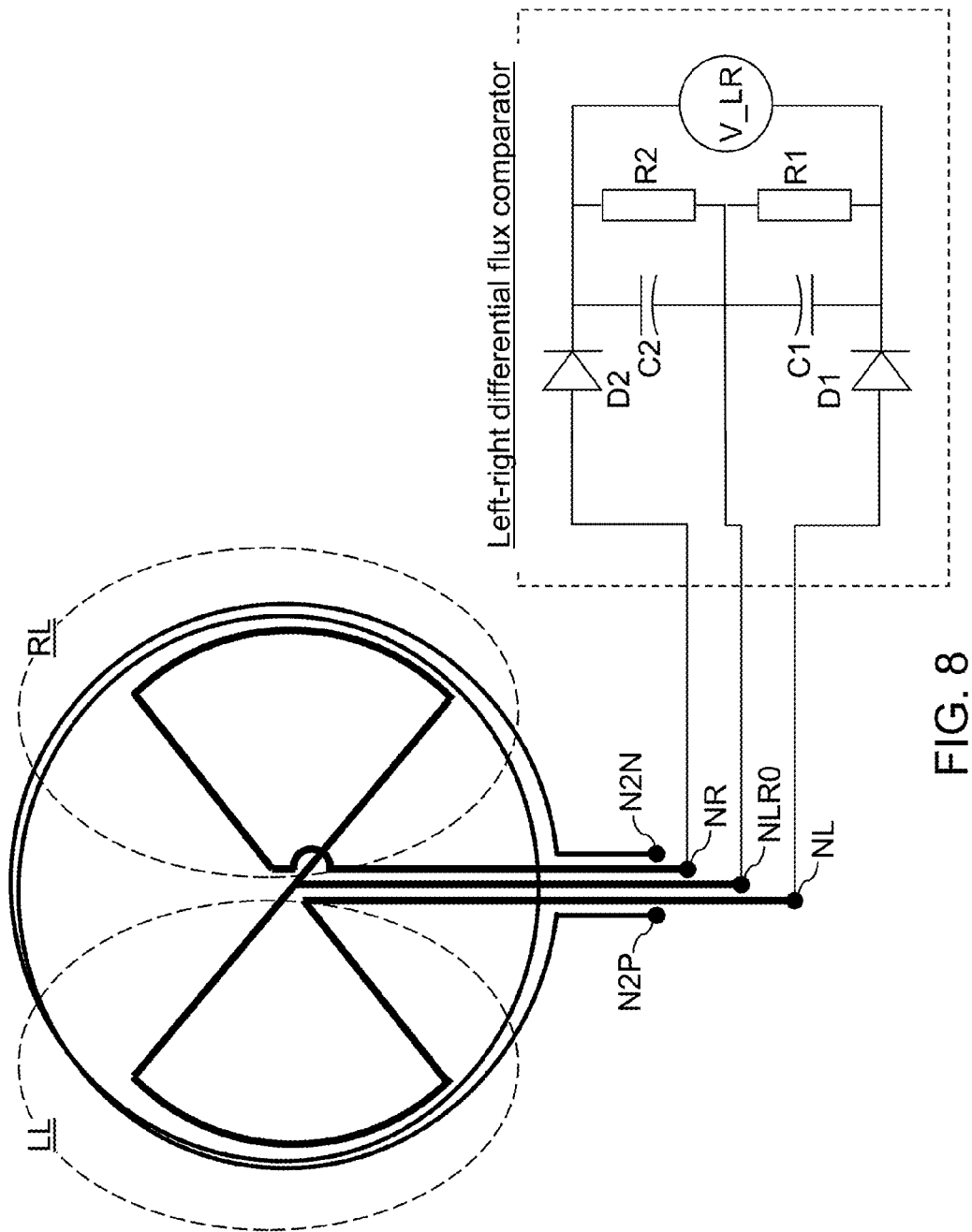
FIG. 8 is an illustration of a first conductor loop affixed to a vehicle and including a first clockwise winding loop on a left side and a first counterclockwise winding loop on a right side that are substantially symmetrically positions relative to a geometrical center of a secondary coil according to an embodiment of the present disclosure.

Referring to FIG. 8, the on-board sensing device can include a position sensing apparatus mounted on the vehicle. The position sensing apparatus includes at least a receiver coil, which is herein referred to as a first conductor loop. The first conductor loop is configured to generate a voltage in proportion to a net magnetic flux captured in a first portion, which is herein referred to as a first loop, and a second portion, which is herein referred to as a second loop. The first loop and second loop are serially connected to each other and would in opposite directions. One of the first loop and the second loop is wound clockwise, and another of the first loop and second loop is wound counterclockwise. The first conductor loop can be affixed to the vehicle.

In one embodiment, the first loop and the second loop can have the same number of turns. In one embodiment, each of the first loop and the second loop can have a single turn, i.e., the cumulative angle changes along the clockwise direction or along the counterclockwise direction add up to about 360 degrees in each of the first loop and the second loop. In another embodiment, each of the first loop and the second loop can have the same number of multiple turns.

In one embodiment, the first loop can be a left-side loop FL and the second loop can be a right-side loop AL. In one embodiment, the left-side loop FL can be a first clockwise winding loop located on the left side of the geometrical center of the secondary coil, and the right-side loop AL can be a first counterclockwise winding loop located on the right side of the center of the secondary coil. In another embodiment, the left-side loop FL can be a first counterclockwise winding loop located on the left side of the geometrical center of the secondary coil, and the right-side loop AL can be a first clockwise winding loop located on the right side of the center of the secondary coil. The left-side loop FL and the right side loop AL can be located at substantially symmetrically positions relative to the geometrical center of the secondary coil. As used herein, a "center" or a "geometrical center" of a loop or a coil is a position identified by a set of Cartesian coordinates that represents the average of the Cartesian coordinates of the loop or the coil. For example, the geometrical center of the secondary coil can be identified by a set of Cartesian coordinates that represents the average of the Cartesian coordinates of the secondary coil. It is understood that lead wire portions that do not contribute to the capture of magnetic flux do not constitute a portion of a coil.

As used herein, a "clockwise" winding refers to a winding that runs clockwise from an end node of located at, or proximal to, the front side or the right side of the winding as seen from above. As used herein, a "counterclockwise" winding refers to a winding that runs counterclockwise from an end node of located at, or proximal to, the front side or the right side of the winding as seen from above. In the Example of FIG. 8, the right-side loop AL has a clockwise winding, and the left-side loop FL has a counterclockwise winding.

The first conductor loop is a receiver coil that generates a voltage that is proportional to the net magnetic flux captured by the first conductor loop. The left-side loop FL and the right-side loop AL are in a differential-flux configuration. Thus, the first conductor loop is in a configuration that causes the end nodes of the first conductor coil to generate a voltage that is proportional to the difference between a first magnetic flux captured by the left-side loop FL and a second magnetic flux captured by the right-side loop AL. Specifically, the end node of the first conductor loop located on the left-side loop FL is herein referred to as a left node NL, and the end node of the first conductor loop located on the right-side loop AL is herein referred to as right node NR. Optionally, a conductor can be attached to the center, i.e., the boundary between the left-side loop FL and the right-side loop AL, of the first conductor loop, and the voltage at the center of the first conductor loop can be provide at a left-right loop center node NLR0.

In one embodiment, the area of the first loop and an area of the second loop are substantially symmetric relative a vertical plane that pass through a geometrical center of the receiver coil, i.e., the first conductive loop. For example, the vertical plane can be parallel to the lengthwise direction of the vehicle and pass through the geometrical center of the secondary coil. While the drawings of the instant application includes 180 degree arcs that represents absence of interconnection between one loop and another loop, it is understood that the 180 degree arcs merely represent non-contacting nature of two loops, and do not represent physical displacement of a loop in a manner that breaks the substantial symmetry between the first loop and the second loop.

The position sensing apparatus can further includes a differential flux comparator that is connected to output nodes of the receiver coil, e.g., the first conductive loop, and configured to rectify the voltage into a direct current (DC) voltage. For example, the differential flux comparator can be a left-right differential flux comparator connected to the left node NL, the right node NR, and optionally the left-right loop center node NLR0. The left-right differential flux comparator can include a first diode D1 connected to the right node NL, a second diode D2 connected to the left node NL, a first capacitor C1, a second capacitor C2, a first resistor R1, a second resistor R2, and a voltmeter V_LR.

In general, the differential flux comparator includes a first diode connected directly to a first output node of the receiver coil, a second diode connected directly to a second output node of the receiver coil, at least one capacitor connected across output nodes of the first and second diodes, at least one resistor connected across the output nodes of the first and second diodes, and a direct current voltmeter connected across the output nodes of the first and second diodes. For example, the left-right differential flux comparator can include the first diode D1 connected directly to the left node NL of the first conductor coil, the second diode D2 connected directly to the right node NR of the first conductor coil, the first capacitor C1 and the second capacitor C2 that are connected across output nodes of the first and second diodes (D1, D2), the first resistor R1 and the second resistor R2 that are connected across the output nodes of the first and second diodes (D1, D2), and the direct current voltmeter V_LR connected across the output nodes of the first and second diodes (D1, D2). In one embodiment, the time constant of the half wave rectifier circuits present in the left-right differential flux comparator can have a time constant at least four times the WPT operating frequency period in order to provide a relatively smooth DV output to the voltmeter V_LR.

The positive node N2P of the secondary coil and the negative node N2N of the secondary coil are schematically illustrated. While two windings are schematically illustrated for the secondary coil, it is understood that the number of windings for the secondary coil can be any positive integer. The positive node N2P and the negative node N2N of the secondary coil are connected to a secondary capacitor and a rectification circuit as illustrated in FIG. 2.

The first conductor loop and the left-right differential flux comparator that can be employed in conjunction with the on-board charging device that includes the secondary coil in order to determine whether the geometrical center of the first conductor loop is offset to the left or to the right of the charging device. The determination on whether the first conductor loop, and correspondingly, the secondary coil, is laterally offset either to the left or to the right relative to the charging device can be made employing the operational principle of flux nulling.

The first conductive loop includes the first loop and the second loop having opposite winding directions and configured to capture magnetic flux in two symmetrical areas that have a mirror symmetry relative to a vertical plane that passes through the center of the first conductive loop and is parallel to the lengthwise direction of the vehicle. The mirror symmetry can be provided, for example, by twisting a single loop into a figure-8 shape. A first loop (e.g., the left-side loop FL) corresponds to an upper portion of a figure-8 shape, and a second loop (e.g., the right-side loop AL) corresponds to a lower portion of the figure-8 shape. The first conductive loop is the combined loop that includes the first loop and the second loop, and has the overall shape of figure "8." The size and the shape of the first loop are matched to the size and the shape of the second loop, respectively.

The charging device can generate a symmetric oscillating magnetic field having a mirror symmetry around a vertical plane that passes through the geometrical center of the charging device. The vertical plane of the mirror symmetry can be the vertical plane that is parallel to the lengthwise direction of the vehicle. In this case, the mirror symmetry can be a left-right mirror symmetry. Further, the magnitude and the direction of the symmetric oscillating magnetic field changes with distance from, and the orientation relative to, the geometrical center of the charging device, and generally decreases with the distance from the geometrical center of the charging device for distances greater than one half of the maximum lateral extent of the charging device.

The symmetric magnetic field can be provided by a symmetric primary coil in the charging device. For example, the primary coil can have a rectangular shape so that a pair of the sides of the rectangular shape is parallel to the intended lengthwise direction of the vehicle in an aligned parking position. Alternately, the primary coil can have a circular shape so that the magnetic field has a cylindrical rotational symmetry in addition to the left-right mirror symmetry.

A first alternating current (AC) voltage is generated in the first loop, and a second AC voltage is generated in the second loop according to Faraday's law in the presence of the AC magnetic field. When the geometrical center of the first conductive loop is placed within the plane of the left-right symmetry, the first voltage and the second voltage cancel out, thereby providing flux nulling. If the geometrical center of the first conductive loop is not within the plane of the left-right symmetry, the first voltage and the second voltage do not cancel out, thereby providing a non-zero voltage across the voltmeter V_LR. For example, if the geometrical center of the first conductive loop is located to the left of the plane of the left-right symmetry, the voltage generated by the left-side loop FL is greater than the voltage generated by the right-side loop AL. Conversely, if the geometrical center of the first conductive loop is located to the right of the plane of the left-right symmetry, the voltage generated by the right-side loop AL is greater than the voltage generated by the left-side loop FL.

Figure 9:
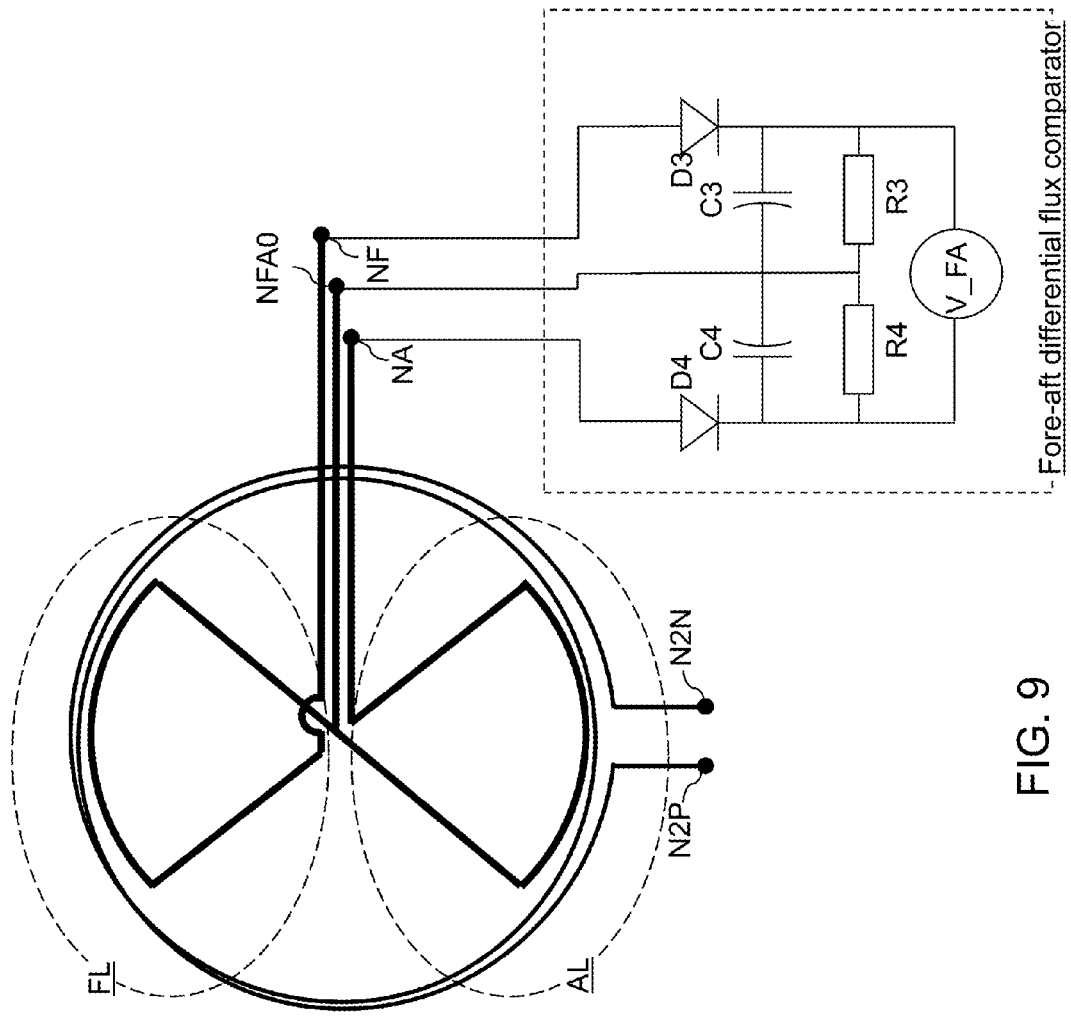
FIG. 9 is an illustration of a second conductor loop affixed to the vehicle and including a second clockwise winding loop on a fore side and a first counterclockwise winding loop on an aft side that are substantially symmetrically positions relative to the geometrical center of the secondary coil according to an embodiment of the present disclosure.

Referring to FIG. 9, the position sensing apparatus within the on-boarding sensing device can include another receiver coil, which is herein referred to as a second conductor loop. The second conductor loop is configured to generate a voltage in proportion to a net magnetic flux captured in a first portion, which is herein referred to as a first loop, and a second portion, which is herein referred to as a second loop. The first loop and second loop are serially connected to each other and would in opposite directions. One of the first loop and the second loop is wound clockwise, and another of the first loop and second loop is wound counterclockwise. The second conductor loop can be affixed to the vehicle.

In one embodiment, the first loop can be a front-side loop FL and the second loop can be an aft-side loop AL. In one embodiment, the front-side loop FL can be a first clockwise winding loop located on the front side of the geometrical center of the secondary coil, and the aft-side loop AL can be a first counterclockwise winding loop located on the aft side of the center of the secondary coil. In another embodiment, the front-side loop FL can be a first counterclockwise winding loop located on the front side of the geometrical center of the secondary coil, and the aft-side loop AL can be a first clockwise winding loop located on the aft side of the center of the secondary coil. The front-side loop FL and the aft side loop AL can be located at substantially symmetrically positions relative to the geometrical center of the secondary coil. In the Example of FIG. 8, the aft-side loop AL has a counterclockwise winding, and the front-side loop FL has a clockwise winding.

The second conductor loop is a receiver coil that generates a voltage that is proportional to the net magnetic flux captured by the second conductor loop. The front-side loop FL and the aft-side loop AL are in a differential-flux configuration. Thus, the second conductor loop is in a configuration that causes the end nodes of the second conductor coil to generate a voltage that is proportional to the difference between a first magnetic flux captured by the front-side loop FL and a second magnetic flux captured by the aft-side loop AL. Specifically, the end node of the second conductor loop located on the front-side loop FL is herein referred to as a front node NF, and the end node of the second conductor loop located on the aft-side loop AL is herein referred to as aft node NA. Optionally, a conductor can be attached to the center, i.e., the boundary between the front-side loop FL and the aft-side loop AL, of the second conductor loop, and the voltage at the center of the second conductor loop can be provide at a front-aft loop center node NFA0.

In one embodiment, the area of the first loop and an area of the second loop are substantially symmetric relative a vertical plane that pass through a geometrical center of the receiver coil, i.e., the second conductive loop. For example, the vertical plane can be parallel to the widthwise direction of the vehicle and pass through the geometrical center of the secondary coil.

The position sensing apparatus can further includes a differential flux comparator that is connected to output nodes of the receiver coil, e.g., the second conductive loop, and configured to rectify the voltage into a direct current (DC) voltage. For example, the differential flux comparator can be a front-aft differential flux comparator connected to the front node NF, the aft node NA, and optionally the front-aft loop center node NFA0. The front-aft differential flux comparator can include a third diode D3 connected to the front node NF, a fourth diode D4 connected to the aft node NA, a third capacitor C3, a fourth capacitor C4, a third resistor R3, a fourth resistor R2, and a voltmeter V_FA.

In general, the differential flux comparator includes a diode connected directly to a first output node of the receiver coil, another diode connected directly to a second output node of the receiver coil, at least one capacitor connected across output nodes of the two diodes, at least one resistor connected across the output nodes of the two diodes, and a direct current voltmeter connected across the output nodes of the two diodes. For example, the front-aft differential flux comparator can include the third diode D1 connected directly to the front node NF of the second conductor coil, the fourth diode D4 connected directly to the aft node NA of the second conductor coil, the third capacitor C3 and the fourth capacitor C4 that are connected across output nodes of the third and fourth diodes (D3, D4), the third resistor R3 and the fourth resistor R4 that are connected across the output nodes of the third and fourth diodes (D3, D4), and the direct current voltmeter V_FA connected across the output nodes of the third and fourth diodes (D3, D4). In one embodiment, the time constant of the half wave rectifier circuits present in the fore-aft differential flux comparator can have a time constant at least four times the WPT operating frequency period in order to provide a relatively smooth DV output to the voltmeter V_FA.

The positive node N2P of the secondary coil and the negative node N2N of the secondary coil are schematically illustrated. As discussed above, the positive node N2P and the negative node N2N of the secondary coil are connected to a secondary capacitor and a rectification circuit as illustrated in FIG. 2.

The second conductor loop and the front-aft differential flux comparator that can be employed in conjunction with the on-board charging device that includes the secondary coil in order to determine whether the geometrical center of the second conductor loop is offset to the front or to the aft of the charging device. The determination on whether the second conductor loop, and correspondingly, the secondary coil, is laterally offset either to the front or to the aft relative to the charging device can be made employing the operational principle of flux nulling.

The second conductive loop includes the first loop and the second loop having opposite winding directions and configured to capture magnetic flux in two symmetrical areas that have a mirror symmetry relative to a vertical plane that passes through the center of the second conductive loop and is parallel to the widthwise direction of the vehicle. The mirror symmetry can be provided, for example, by twisting a single loop into a figure-8 shape. A first loop (e.g., the front-side loop FL) corresponds to an upper portion of a figure-8 shape, and a second loop (e.g., the aft-side loop AL) corresponds to a lower portion of the figure-8 shape. The second conductive loop is the combined loop that includes the first loop and the second loop, and has the overall shape of figure "8." The size and the shape of the first loop are matched to the size and the shape of the second loop, respectively.

The charging device can generate a symmetric oscillating magnetic field having a mirror symmetry around a vertical plane that passes through the geometrical center of the charging device. The vertical plane of the mirror symmetry can be the vertical plane that is parallel to the widthwise direction of the vehicle. In this case, the mirror symmetry can be a front-aft mirror symmetry. Further, the magnitude and the direction of the symmetric oscillating magnetic field changes with distance from, and the orientation relative to, the geometrical center of the charging device, and generally decreases with the distance from the geometrical center of the charging device for distances greater than one half of the maximum lateral extent of the charging device.

The symmetric magnetic field can be provided by a symmetric primary coil in the charging device. For example, the primary coil can have a rectangular shape so that a pair of the sides of the rectangular shape is parallel to the intended lengthwise direction of the vehicle in an aligned parking position. Alternately, the primary coil can have a circular shape so that the magnetic field has a cylindrical rotational symmetry in addition to the front-aft mirror symmetry.

A first alternating current (AC) voltage is generated in the first loop, and a second AC voltage is generated in the second loop according to Faraday's law in the presence of the AC magnetic field. When the geometrical center of the second conductive loop is placed within the plane of the front-aft symmetry, the first voltage and the second voltage cancel out, thereby providing flux nulling. If the geometrical center of the second conductive loop is not within the plane of the front-aft symmetry, the first voltage and the second voltage do not cancel out, thereby providing a non-zero voltage across the voltmeter V_LR. For example, if the geometrical center of the second conductive loop is located to the front of the plane of the front-aft symmetry, the voltage generated by the front-side loop FL is greater than the voltage generated by the aft-side loop AL. Conversely, if the geometrical center of the second conductive loop is located to the aft of the plane of the front-aft symmetry, the voltage generated by the aft-side loop AL is greater than the voltage generated by the front-side loop FL.

Figure 10:
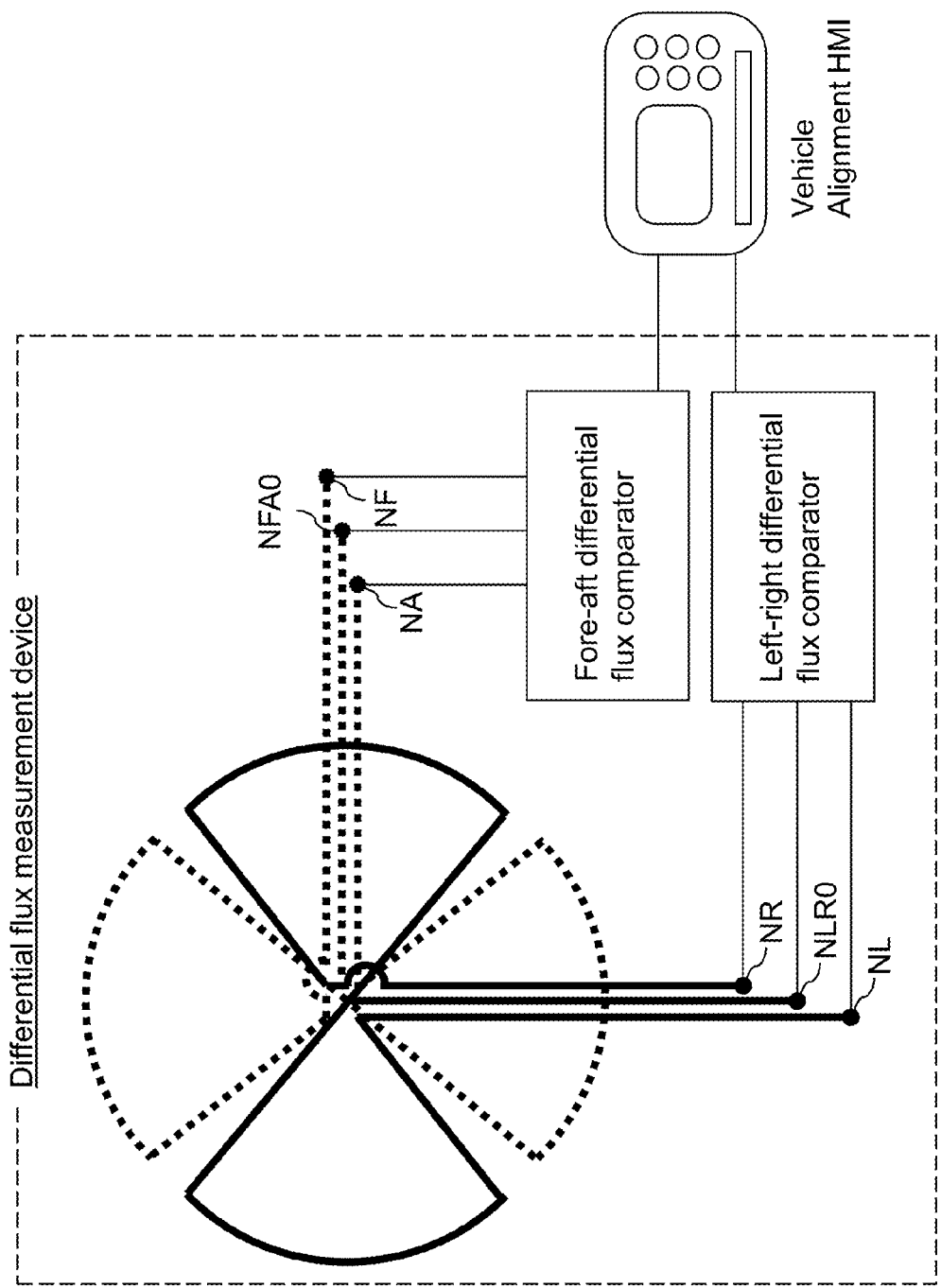
FIG. 10 is an illustration of on-board sensing devices including the first conductor loop, the second conductor loop, a left-right differential flux comparator, and a fore-aft differential flux comparator, and a vehicle alignment human-machine interface (HMI) according to an embodiment of the present disclosure.

Referring to FIG. 10, the first conductive loop and the left-right differential flux comparator illustrated in FIG. 8 and the second conductive loop and the fore-aft differential flux comparator in FIG. 9 can be integrated into the on-board sensing devices. The two loops within the first conductive loop are hereafter referred to as a first loop and a second loop, and the two loops within the second conductive loop are hereafter referred to as a third loop and a fourth loop.

The area of the first loop and the area of the second loop can be substantially symmetric about a first vertical plane that passes through the geometrical center of a receiver coil, i.e., the first conductive loop. The area of the third loop and the area of the fourth loop can be substantially symmetric about a second vertical plane that passes through the geometrical center of another receiver coil, i.e., the second conductive loop. In one embodiment, one of the first and second vertical planes can be parallel to the lengthwise direction of the vehicle, and another of the first and second vertical planes can be parallel to a widthwise direction of the vehicle.

In one embodiment, the first conductive loop and the second conductive loop can be configured such that no more than 10% of each area of the first, second, third, and fourth loops overlaps with areas of any other of the first, second, third, and fourth loops. Additionally or alternately, the areas of the first, second, third, and fourth loops can collectively overlap with more than 90% of an area of the secondary coil.

In one embodiment, the area of the first loop and the area of the second loop can be substantially symmetric relative a vertical plane that passes through a geometrical center of the first conductive coil. The geometrical center of the secondary coil can be located along a vertical line that passes through the geometrical center of the first conductive coil. Further, the geometrical center of the secondary coil can be located along a vertical line that passes through the geometrical center of the second conductive coil. Thus, the geometrical center of the secondary coil, the geometrical center of the first conductive coil, and the geometrical center of the second conductive coil can be within the same vertical line.

The position sensing apparatus illustrated in FIG. 10 can be employed to align the vehicle to the charging device along the left-right direction and along the front-aft direction, i.e., along the widthwise direction and along the lengthwise direction of the vehicle.

In one embodiment, outputs of the two voltmeters V_LR and V_FA can be provided to a micro-controller, which can output the data in a human perceptible form. For example, the data can be displayed as a first bar graph that indicates how centered the vehicle is relative to the charging device along the left-right direction, and a second bar graph that indicates how centered the vehicle is relative to the charging device along the front-aft direction. Alternately, the data can be displayed on an "electronic swash plate" that provides a polar display, which shows the current vehicle position relative to the transmit pad in polar coordinates (radar pan position indicating).

In one embodiment, the position sensing apparatus can be employed to align a vehicle-mounted receiver coil, i.e., the secondary coil, with a ground-based wireless power transmitter coil, i.e., the primary coil of the charging device that generates an AC magnetic field. During the alignment, the first conductor loop that is affixed to the vehicle and is disposed within the AC magnetic field. The first conductor loop generates an induced voltage that is indicative of the vehicle's left and right position relative to the charging device that emits the AC magnetic field, i.e., the wireless power transmitter coil. The second conductor loop is affixed to the vehicle and is disposed within the AC magnetic field. The second conductor loop generates an induced voltage that is indicative of the vehicle's fore and aft position relative to the charging device. The voltages in the first and in the second conductor loops are substantially zero when the sensing apparatus is aligned to the charging device, i.e., positioned within an alignment zone in relation to the transmitter coil of the charging device. Each of the first and second conductor loops can be approximately figure-eight shaped. The alignment zone can be located at a central point of the transmitter coil.

A vehicle can be aligned to the charging device for wireless power transfer employing methods of an embodiment of the present disclosure. First, a position sensing apparatus described above can be mounted on a vehicle. The position sensing apparatus includes at least a receiver coil configured to generate a voltage in proportion to a net magnetic flux captured in a first loop and a second loop that are serially connected to each other. One of the first loop and the second loop is wound clockwise and another of the first loop and second loop is wound counterclockwise. Second, the vehicle can be positioned in a vicinity of the charging device for wireless power transfer. Third, positional data representing the position of the vehicle relative to the charging device is generated employing the position sensing apparatus while the primary coil in the charging device generates an alternating current (AC) magnetic field. Fourth, the vehicle can be aligned employing the positional data.

In one embodiment, the positional data can be displayed on a vehicle alignment human-machine interface (HMI) for human perception. In one embodiment, the positional data can represent a lateral offset of the secondary coil connected to the on-board charger relative to the charging device, i.e., the transmit pad.

The position sensing apparatus can be employed as a vehicle to infrastructure coupling coil alignment sensor. With the position sensing apparatus, the power coupling apparatus, i.e., the charging facility illustrated in FIG. 7 and the secondary coil, can be employed to guide the vehicle into an optimal charging position for wireless power transfer.

According to an aspect of the present disclosure, there is no net voltage present on the sensor loops when the vehicle is aligned to the charging device because the induced voltages from two loops (e.g., the first loop and the second loop) within the same conductive loop (e.g., the first conductive loop) cancel out.

In one embodiment, for stationary and/or in-motion wireless power transfer, a dedicated short range communications (DSRC) system mounted on a vehicle can be employed to communicate a grid-tied converter when the vehicle is within a predefined range to cause the charging device (e.g., the transmit pad) to energize the transmit coil at a low power level. The predefined range can be, for example, from 10 m to 200 m, although lesser and greater predefined ranges can also be employed. In one embodiment, the charging device can continuously generate an AC magnetic field. In another embodiment, the charging device can intermittently generate an AC magnetic field, e.g., by providing short bursts of AC magnetic fields spaced by zero magnetic field. At one point, the position sensing apparatus attached to the vehicle begins to pick up the presence of the field, and provide the vehicle operator with an indication on the current alignment between the charging device and the vehicle. Further, the position sensing apparatus can instruct the driver of the vehicle to move the vehicle along a certain direction to align the vehicle to the charging device.

Figure 11:
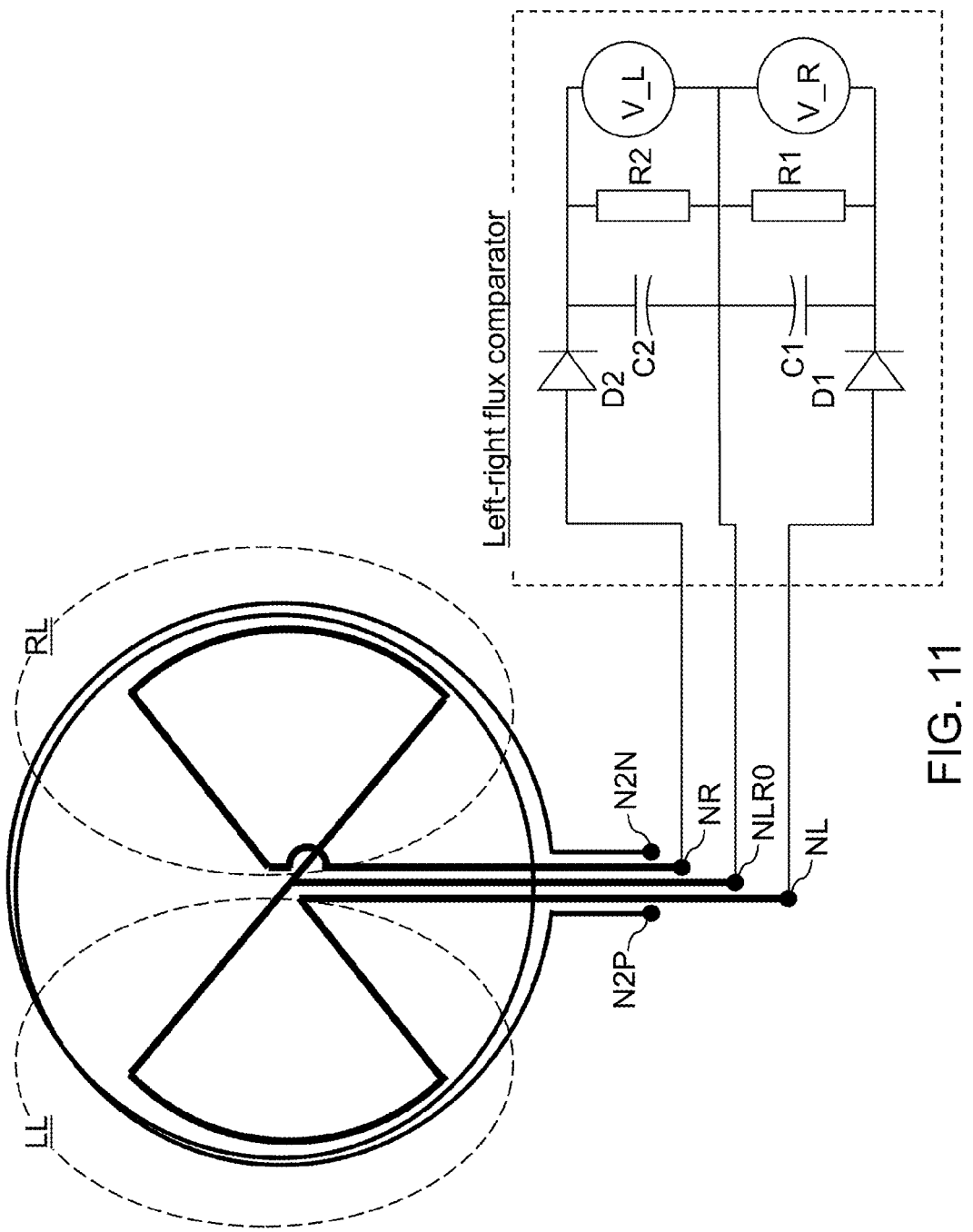
FIG. 11 is an illustration of a flux comparator according to an embodiment of the present disclosure.

Referring to FIG. 11, alternate electronic circuits can also be employed in lieu of the left-right differential flux comparator illustrated in FIG. 8 or the fore-aft differential flux comparator illustrated in FIG. 9. For example, two voltmeters can be employed to measure a first voltage generated in the first loop and a second voltage generated in the second loop separately. The difference between the first voltage and the second voltage is measured to determine the degree of offset of the center of a receiver coil, which can be the first conductive loop or the second conductive loop described above, relative to the center of the charging device, e.g., a transmit pad.

EXAMPLE

An exemplary WPT alignment sensor was manufactured and tested to verify the operational principles of the embodiments of the present disclosure. Two receiver coils having three turns were employed to form a position sensing apparatus. Each of the two receiver coils was twisted in the middle to form one loop having a clockwise winding and another loop having a counterclockwise winding in a "bow-tie" arrangement. The areas of the two loops within each receiver coil were matched, i.e., the areas of the two loops for each receiver coil had the same area. The first receiver coil formed a left-right coil pair (L-R coil pair) having the configuration of the first conductive loop described above. The second receiver coil formed a front-aft coil pair (F-A coil pair) having the configuration of the second conductive loop described above.

A Cartesian coordinate system was selected such that the x-axis is horizontal and parallel to the mirror symmetry plane of the second receiver coil for the two loops therein, i.e., parallel to the widthwise direction of a hypothetical vehicle to mount the exemplary WPT sensor. The y-axis is horizontal and parallel to the mirror symmetry plane of the first receiver coil for the two loops therein, i.e., parallel to the lengthwise direction of the hypothetical vehicle. The F-A coil pair extended along the y-axis of the Cartesian coordinate system, and the L-R coil pair extended along the x-axis of the Cartesian coordinate system.

Figure 12:
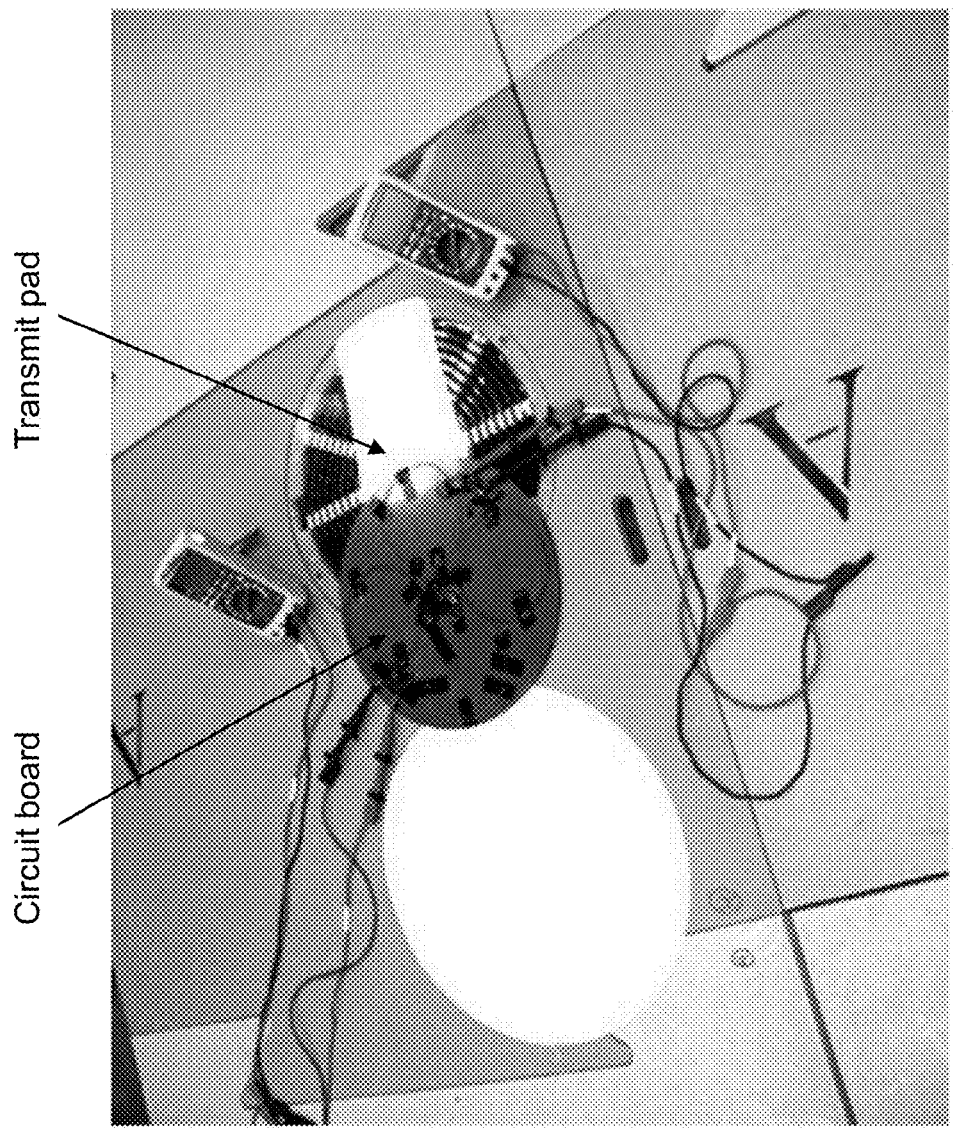
FIG. 12 is a photo of the exemplary WPT alignment sensor.

Referring to FIG. 12, a photo of the exemplary WPT alignment sensor is shown. The primary coil in the transmit pad had seven turns and had a diameter of 300 mm. The spacing between the primary coil and the circuit board that included the L-R coil pair and the F-A coil pair was 75 mm. In order to maintain the magnitude of the magnetic field below the safety threshold value to 6.25 µT, only 3.5 $A_{rms}$ of current was flowed through the primary coil in the transmit pad that was designed to flow 200 $A_{rms}$ during wireless power transfer. Differential flux comparators illustrated in FIGS. 8 and 9 were employed, in which the capacitors had a capacitance of 390 pF and resistors had a resistance of 620 kOhm. The rectified and filtered outputs from the differential flux comparators had magnitudes on the order of hundreds of millivolts. The circuit board including the circuit board was moved around by hand while the gap was maintained at 75 mm. The diameter of the circuit board was 330 mm.

Table 1 tabulates the voltage $U_{FA}$ across the F-A coil pair and the voltage $U_{LR}$ across the L-R coil pair. The x-axis offset and the y-axis offset are measured for position of the center of the circuit board relative to the center of the primary coil. 165 mm of offset corresponds to the radius of the primary coil. At 165 mm of offset in any direction, an edge of the circuit board overlapped the center of the primary coil. The exemplary WPT alignment sensor provided outputs that are extremely sensitive to horizontal displacement of the centers of the F-A coil pair and the L-R coil pair relative to the center of a transmit pad.

TABLE 1

Measured voltages for the L-R coil pair and the F-A coil pair

| x-axis offset of the circuit board from the primary coil | y-axis offset of the circuit board from the primary coil | $U_{FA}$ (mV) | $U_{LR}$ (mV) | Comments |
|---|---|---|---|---|
| 0 | 0 | 5 | 23 | Complete overlap of the board with the primary coil |
| 0 | 165 mm | 0.4 | 170 | The circuit board is offset to the right. |
| 0 | −165 mm | 0.5 | −255 | The circuit board is offset to the left. |
| 165 mm | 0 | −197 | 0.06 | The circuit board is offset to the front. |
| −165 mm | 0 | 194 | −0.3 | The circuit board is offset to the aft. |

The residual voltage across the F-A coil pair when the circuit board is aligned along the x-axis (i.e., the x-axis offset is zero) and the residual voltage across the L-R coil pair when the circuit board is aligned along the y-axis (i.e., the y-axis offset is zero) are due to the manual alignment of the circuit board and accompanying error in alignment. Further, any small asymmetry in the coil areas (i.e., between the first loop and the second loop of the first conductive loop, or between the third loop and the fourth loop of the second conductive loop) and variations in the spacing between the circuit board and the transmit pad contribute to the non-zero residual voltage. The output voltages have a polarity, i.e., can be positive or negative. The polarity of the output voltage indicates in which direction the receiver coils are offset relative to the center of the primary coil. In other words, the polarity of the voltage $U_{FA}$ across the F-A coil pair indicates whether the vehicle is offset to the front side or to the aft side of an optimal parking area defined by the location of the transmit pad, and the voltage $U_{LR}$ across the L-R coil pair indicates whether the vehicle is offset to the left side or to the right side of the optimal parking area defined by the location of the transmit pad. The information on the offset of the vehicle relative to the optimal parking position can be provided to the vehicle HMI device for display in a form perceptible to humans, i.e., the driver of the vehicle.

While the invention has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. A structure comprising a position sensing apparatus mounted on a vehicle, said position sensing apparatus comprising at least a receiver coil configured to generate a voltage in proportion to a net magnetic flux captured in a first loop and a second loop that are serially connected to each other, wherein one of said first loop and said second loop is wound clockwise and another of said first loop and second loop is wound counterclockwise, wherein said position sensing apparatus further comprises a vehicle alignment human-machine interface (HMI) configured to indicate a positional offset of said vehicle relative to a source of a magnetic field as calculated from a measurement on said voltage.

2. The structure of claim 1, wherein an area of said first loop and an area of said second loop are substantially symmetric relative a vertical plane that pass through a geometrical center of said receiver coil.

3. The structure of claim 2, wherein said vertical plane is parallel to a lengthwise direction of said vehicle.

4. The structure of claim 2, wherein said vertical plane is parallel to a widthwise direction of said vehicle.

5. The structure of claim 1, wherein said position sensing apparatus further comprises a second receiver coil configured to generate another voltage in proportion to a net magnetic flux captured in a third loop and a fourth loop that are serially connected to each other, wherein one of said third loop and said fourth loop is wound clockwise and another of said third loop and said fourth loop is wound counterclockwise.

6. The structure of claim 5, wherein an area of said first loop and an area of said second loop are substantially symmetric about a first vertical plane that passes through a geometrical center of said receiver coil, and an area of said third loop and an area of said fourth loop are substantially symmetric about a second vertical plane that passes through said geometrical center of said second receiver coil.

7. The structure of claim 6, wherein one of said first and second vertical planes is parallel to a lengthwise direction of said vehicle, and another of said first and second vertical planes is parallel to a widthwise direction of said vehicle.

8. The structure of claim 5, further comprising a secondary coil mounted to said vehicle and connected to an on-board charger configured to charge a battery through wireless power transfer employing magnetic coupling of said secondary coil to a primary coil in a charging device located outside said vehicle, wherein no more than 10% of each area of said first, second, third, and fourth loops overlaps with areas of any other of said first, second, third, and fourth loops, and areas of said first, second, third, and fourth loops collectively overlap with more than 90% of an area of said secondary coil.

9. The structure of claim 2, further comprising a secondary coil mounted to said vehicle and connected to an on-board charger configured to charge a battery through wireless power transfer employing magnetic coupling of said secondary coil to a primary coil in a charging device located outside said vehicle.

10. The structure of claim 9, and wherein a geometrical center of said secondary coil is located along a vertical line that passes through said geometrical center of said receiver coil.

11. A structure comprising a position sensing apparatus mounted on a vehicle, said position sensing apparatus comprising at least a receiver coil configured to generate a voltage in proportion to a net magnetic flux captured in a first loop and a second loop that are serially connected to each other, wherein one of said first loop and said second loop is wound clockwise and another of said first loop and second loop is wound counterclockwise, wherein said position sensing apparatus further comprises a differential flux comparator that is connected to output nodes of said receiver coil and configured to rectify said voltage into a direct current (DC) voltage.

12. The structure of claim 11, wherein said differential flux comparator comprises a first diode connected directly to a first output node of said receiver coil, a second diode connected directly to a second output node of said receiver coil, at least one capacitor connected across output nodes of said first and second diodes, at least one resistor connected across said output nodes of said first and second diodes, and a direct current voltmeter connected across said output nodes of said first and second diodes.

\* \* \* \* \*